(12) United States Patent
Mutsuda et al.

(10) Patent No.: US 10,370,509 B2
(45) Date of Patent: Aug. 6, 2019

(54) FIBER-REINFORCED RESIN, PROCESS FOR PRODUCING SAME, AND MOLDED ARTICLE

(71) Applicant: DAICEL-EVONIK LTD., Tokyo (JP)

(72) Inventors: Mitsuteru Mutsuda, Himeji (JP); Yoshiki Nakaie, Himeji (JP); Takayuki Uno, Himeji (JP)

(73) Assignee: DAICEL-EVONIK LTD., Tokyo (JP)

( * ) Notice: Subject to any disclaimer, the term of this patent is extended or adjusted under 35 U.S.C. 154(b) by 0 days.

(21) Appl. No.: 15/759,976

(22) PCT Filed: Oct. 5, 2016

(86) PCT No.: PCT/JP2016/079689
§ 371 (c)(1),
(2) Date: Mar. 14, 2018

(87) PCT Pub. No.: WO2017/061502
PCT Pub. Date: Apr. 13, 2017

(65) Prior Publication Data
US 2018/0258240 A1 Sep. 13, 2018

(30) Foreign Application Priority Data

Oct. 7, 2015 (JP) .................................. 2015-199751

(51) Int. Cl.
*C08J 5/04* (2006.01)
*C08J 5/24* (2006.01)
(Continued)

(52) U.S. Cl.
CPC .............. *C08J 5/042* (2013.01); *B29B 11/16* (2013.01); *C08G 59/1472* (2013.01);
(Continued)

(58) Field of Classification Search
CPC ... B29B 11/16; C08J 2300/04; C08J 2377/00; C08J 3/12; C08J 5/042; C08J 5/10;
(Continued)

(56) References Cited

U.S. PATENT DOCUMENTS 8,097,333 B2* 1/2012 Tilbrook ................ C08G 59/38
428/297.4
2011/0244007 A1 10/2011 Matsui et al.
(Continued)

FOREIGN PATENT DOCUMENTS

JP 2007-246567 A 9/2007
JP 2009-248357 A 10/2009
(Continued)

OTHER PUBLICATIONS

Material Data Center, Trogamid CX7323, accessed online Oct. 30, 2018.*
(Continued)

*Primary Examiner* — Camie S Thompson
(74) *Attorney, Agent, or Firm* — Birch, Stewart, Kolasch & Birch, LLP

(57) ABSTRACT

(A) A reinforcing fiber, (B) a resin particle, and (C) a matrix resin are combined to prepare a resin composition which improves a reinforcing effect by the reinforcing fiber. The reinforcing fiber (A) contains a carbon fiber. The resin particle (B) contains a semicrystalline thermoplastic resin, the semicrystalline thermoplastic resin in the resin particle (B) has an exothermic peak in a temperature range between a glass transition temperature of the semicrystalline thermoplastic resin and a melting point of the semicrystalline thermoplastic resin, the peak being determined by heating the resin particle (B) at a rate of 10° C./min. by differential scanning calorimetry (DSC), and the resin particle (B) has an average particle size of 3 to 40 µm. The semicrystalline
(Continued)

thermoplastic resin may be a polyamide resin having a melting point of not lower than 150° C. (particularly, a polyamide resin having an alicyclic structure and a glass transition temperature of not lower than 100° C., or a polyamide resin having a γ-type crystal structure or a degree of crystallinity of not more than 50%). The matrix resin (C) may be a thermosetting resin.

7 Claims, 9 Drawing Sheets

(51) Int. Cl.
| | |
|---|---|
| *C08J 3/12* | (2006.01) |
| *C08J 5/10* | (2006.01) |
| *B29B 11/16* | (2006.01) |
| *C08G 59/16* | (2006.01) |
| *C08K 7/04* | (2006.01) |
| *C08L 63/00* | (2006.01) |
| *C08L 71/02* | (2006.01) |
| *C08L 77/00* | (2006.01) |
| *C08G 69/14* | (2006.01) |
| *C08G 69/26* | (2006.01) |

(52) U.S. Cl.
CPC ............ *C08G 69/14* (2013.01); *C08G 69/26* (2013.01); *C08J 3/12* (2013.01); *C08J 5/10* (2013.01); *C08J 5/24* (2013.01); *C08K 7/04* (2013.01); *C08L 63/00* (2013.01); *C08L 71/02* (2013.01); *C08L 77/00* (2013.01); *C08J 2300/24* (2013.01); *C08J 2363/00* (2013.01); *C08J 2377/00* (2013.01)

(58) Field of Classification Search
CPC ...... C08J 5/24; C08J 2300/24; C08J 2363/24; C08J 2363/00; C08L 63/00; C08L 77/00; C08L 77/02; C08L 77/06; C08L 79/08; C08L 71/02; Y10T 428/24994; Y10T 442/2984; C08G 69/26; C08G 69/14; C08G 59/1472
USPC ..... 428/297.4, 294.4, 301.4, 295.1; 523/221, 523/468; 442/197
See application file for complete search history.

(56) References Cited

U.S. PATENT DOCUMENTS

| | | | |
|---|---|---|---|
| 2012/0035299 A1* | 2/2012 | Arai | .................. C08G 59/28 523/427 |
| 2013/0038822 A1 | 2/2013 | Aono et al. | |
| 2014/0135443 A1 | 5/2014 | Aerts et al. | |
| 2015/0031834 A1 | 1/2015 | Kobayashi et al. | |
| 2015/0344686 A1 | 12/2015 | Shimizu et al. | |
| 2016/0200910 A1 | 7/2016 | Mutsuda et al. | |
| 2018/0244873 A1* | 8/2018 | Aerts | .................. B33Y 70/00 |

FOREIGN PATENT DOCUMENTS

| | | | | |
|---|---|---|---|---|
| JP | 2012-46690 A | 3/2012 | | |
| JP | 2013-203788 A | 10/2013 | | |
| JP | 2014-145003 A | 8/2014 | | |
| JP | 5655976 B1 | 1/2015 | | |
| WO | WO 2011/132680 A1 | 10/2011 | | |
| WO | WO 2014/078095 A2 | 5/2014 | | |
| WO | WO 2015/033998 A1 | 3/2015 | | |
| WO | WO-2015033998 A1 * | 3/2015 | ............ C08L 101/00 |

OTHER PUBLICATIONS

English translation of International Preliminary Report on Patentability and Written Opinion dated Apr. 19, 2018, in PCT International Application No. PCT/JP2016/079689.
International Search Report for PCT/JP2016/079689 dated Dec. 13, 2016.
Written Opinion of the International Searching Authority for PCT/JP2016/079689 (PCT/ISA/237) dated Dec. 13, 2016.
Notification of Reasons for Refusal dated Apr. 3, 2018, in Japanese Patent Application No. 2017-544543, with English translation.
Evonik Industries, "Trogamid® CX Transparent polyamides with an outstanding combination of properties", Retrieved Dec. 10, 2018, pp. 1-27 (28 pages total).
Taiwanese Office Action and Search Report, dated Dec. 7, 2018, for Taiwanese Application No. 105132373.
Extended European Search Report, dated Feb. 20, 2019, for European Application 18202358.0.

* cited by examiner

[Fig. 1]
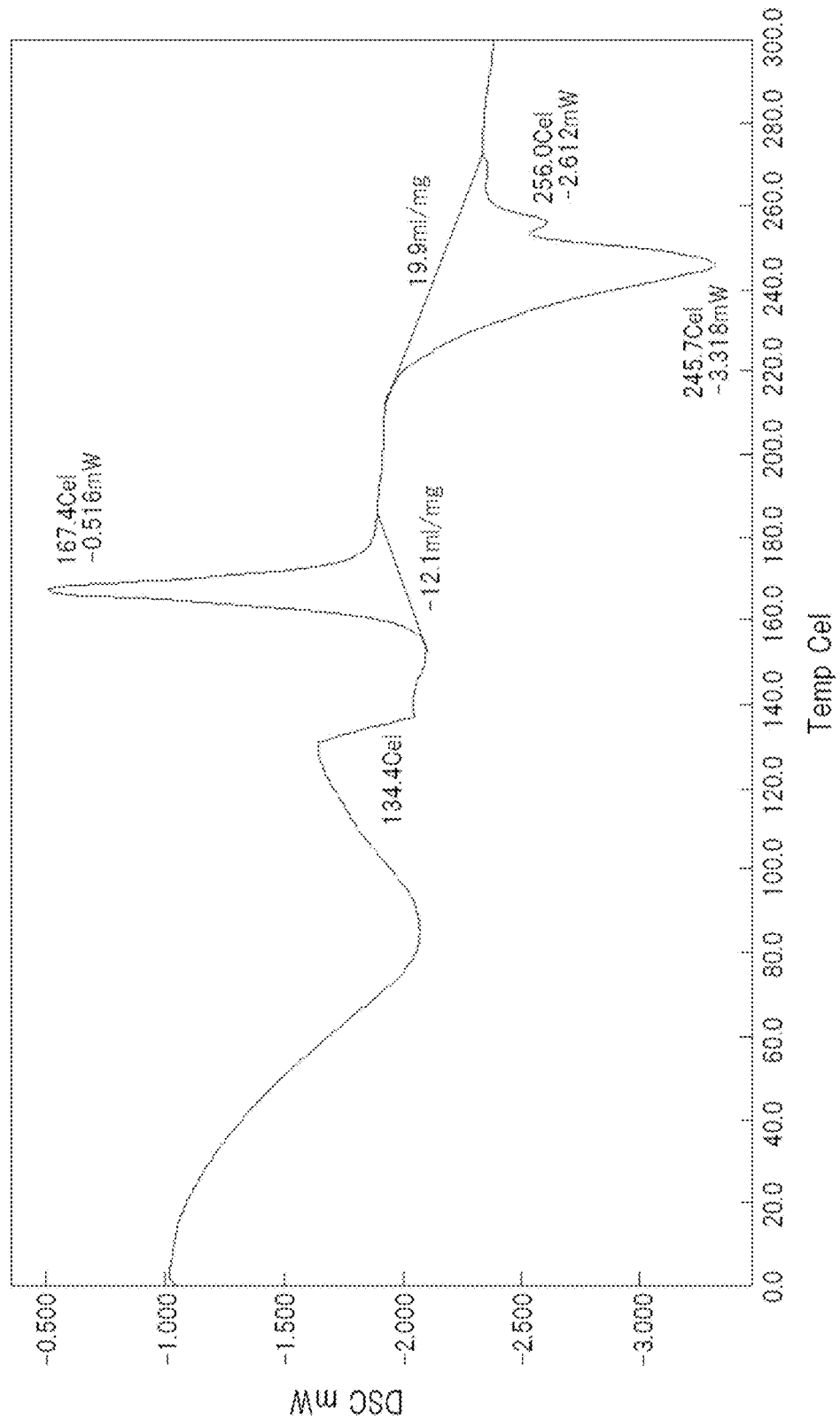

[Fig. 2]
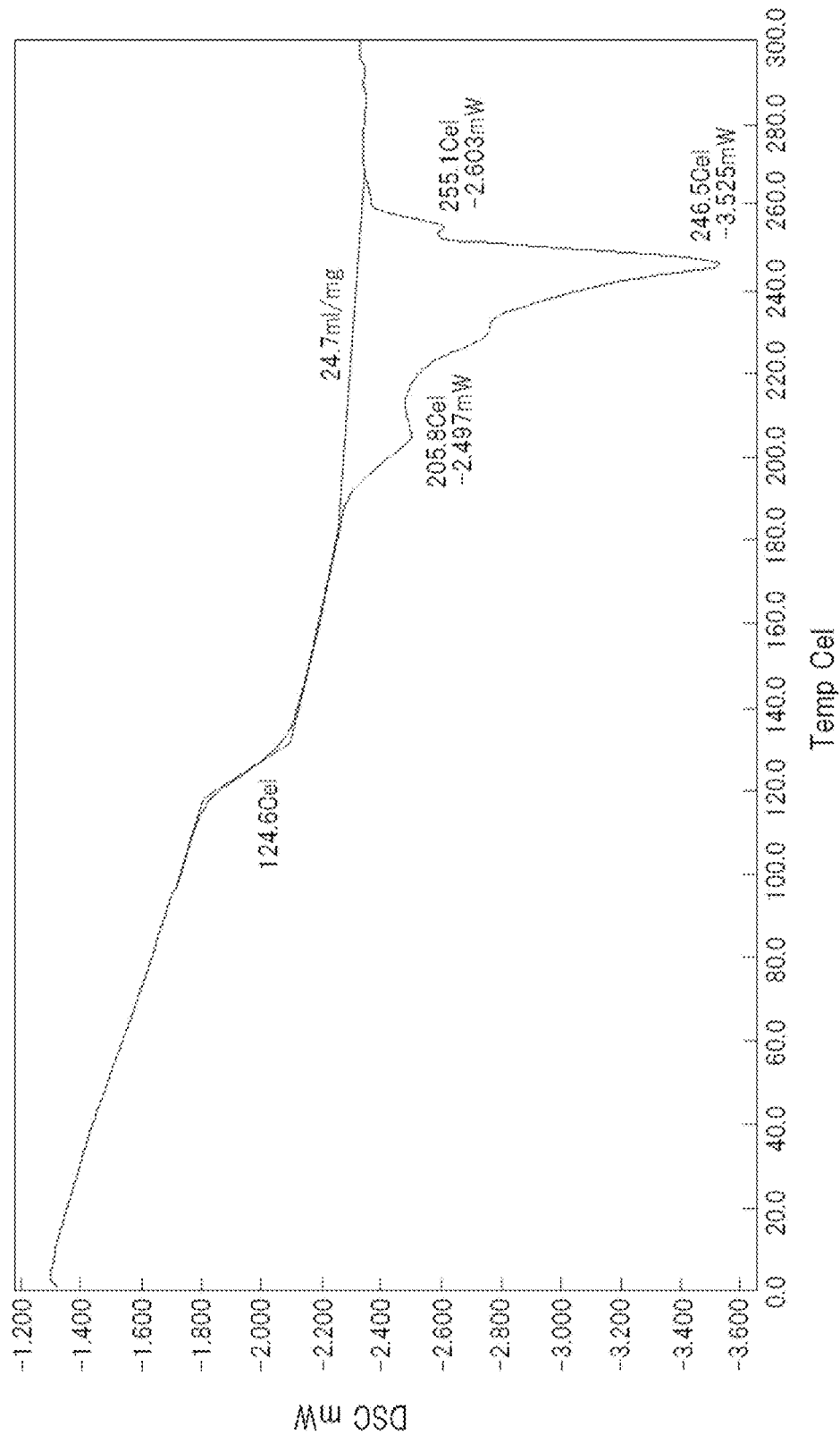

[Fig. 3]
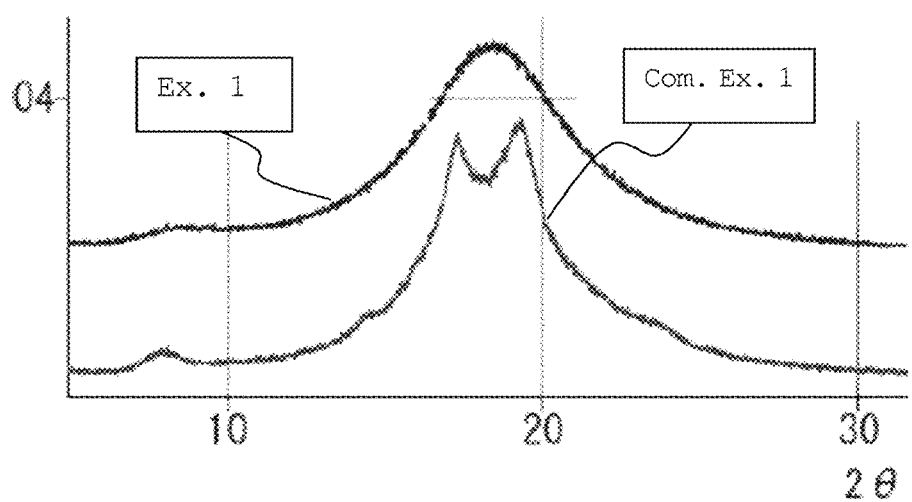

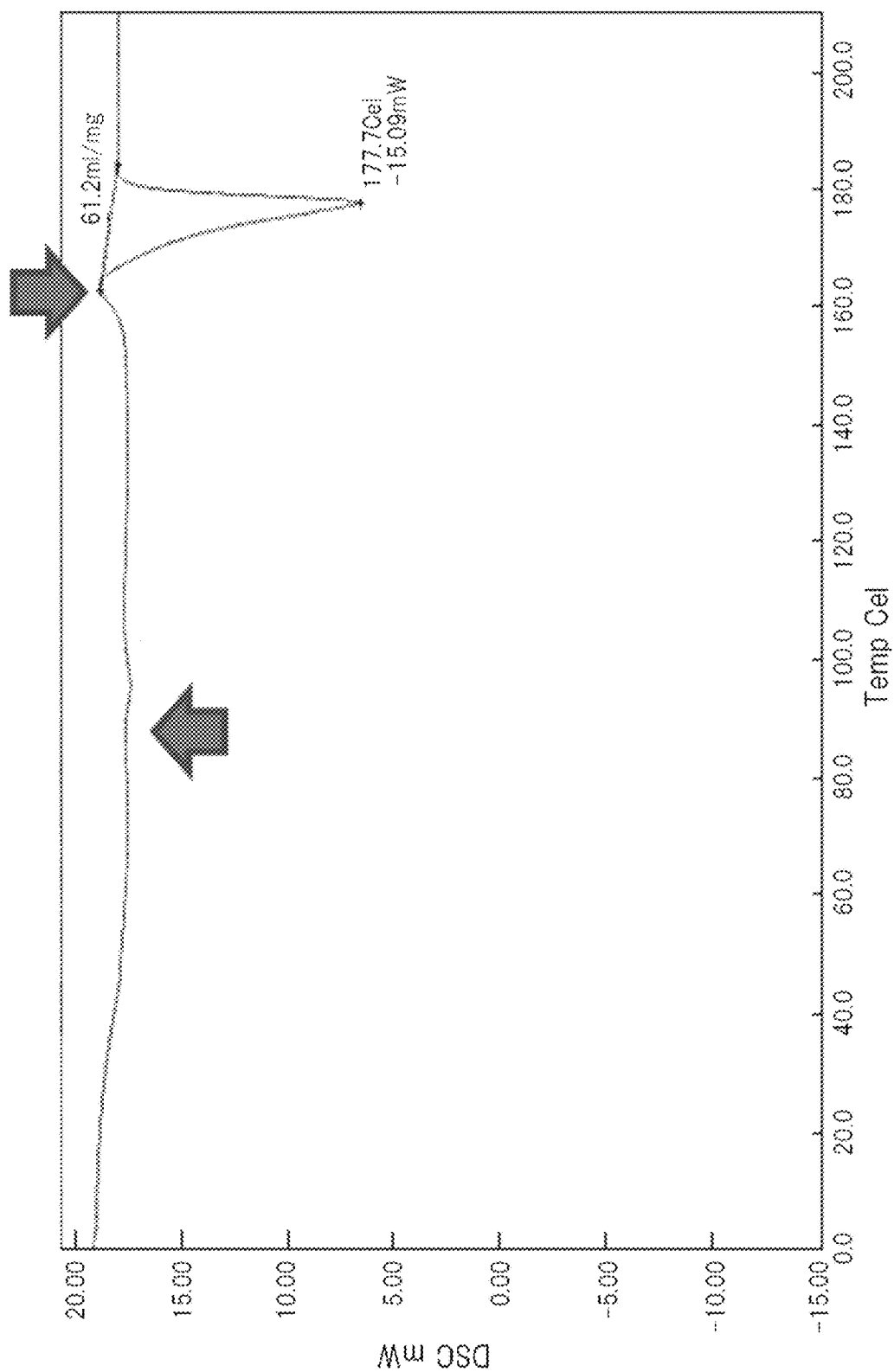
[Fig. 4]

[Fig. 5]
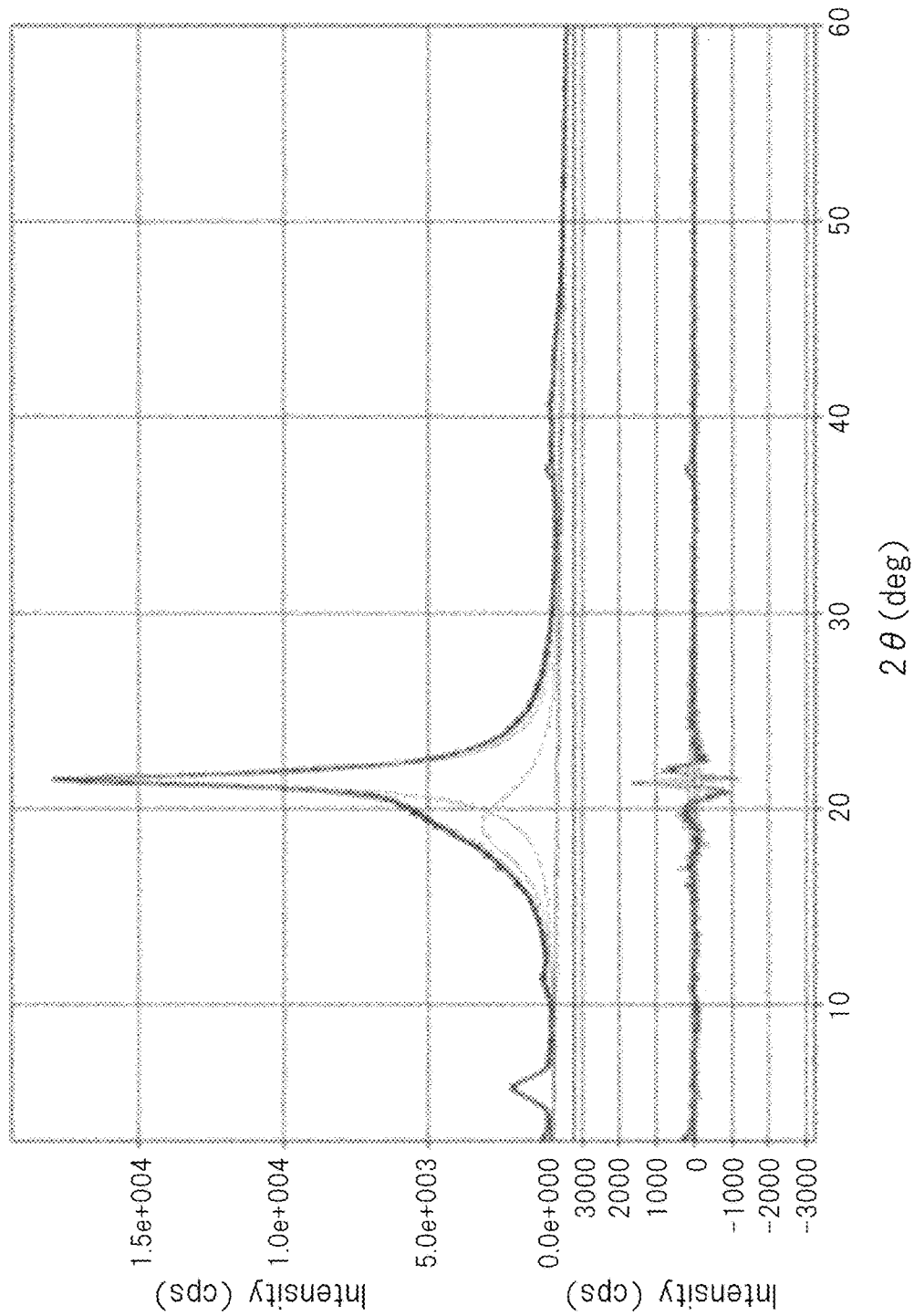

[Fig. 6]
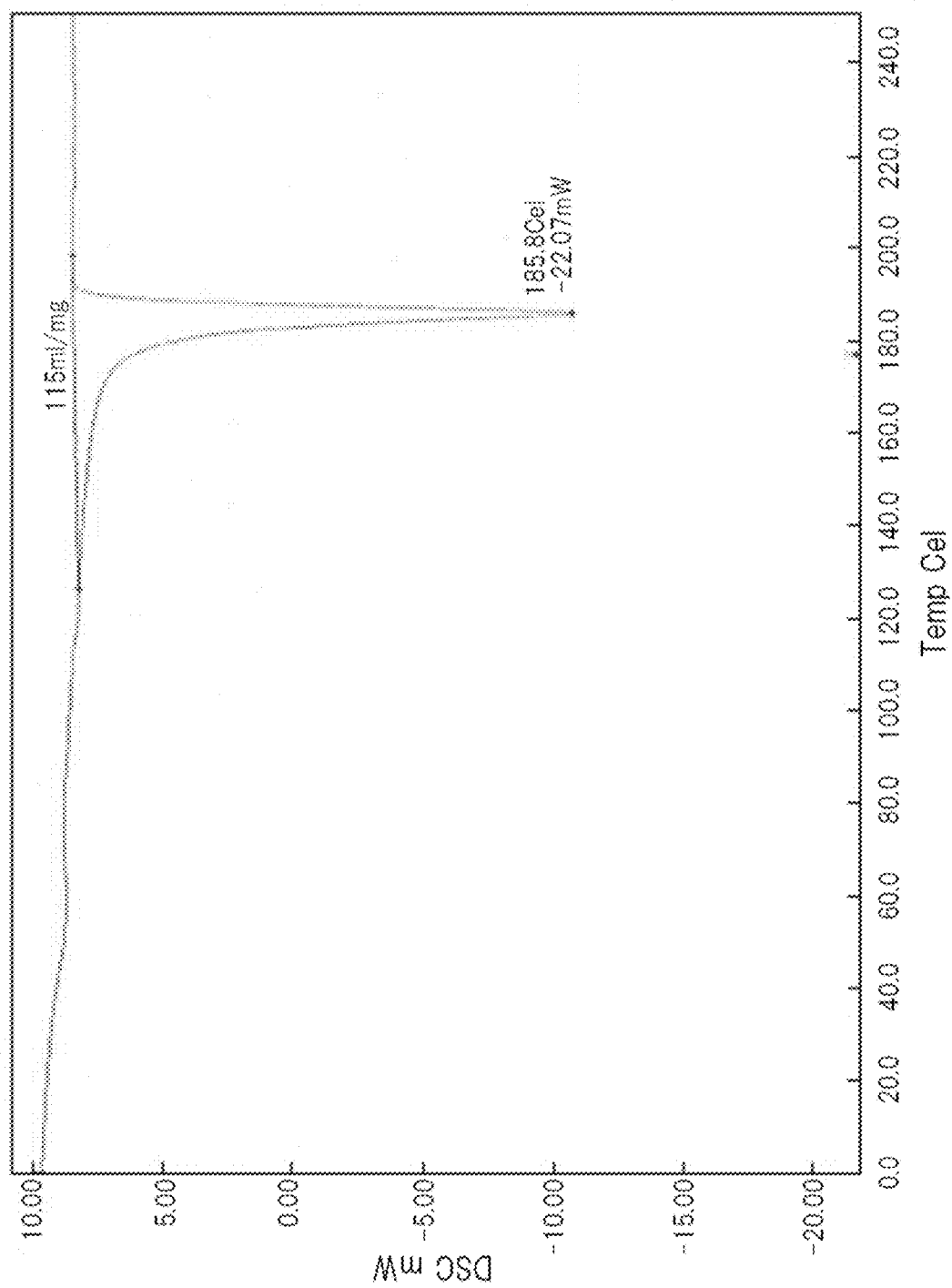

[Fig. 7]
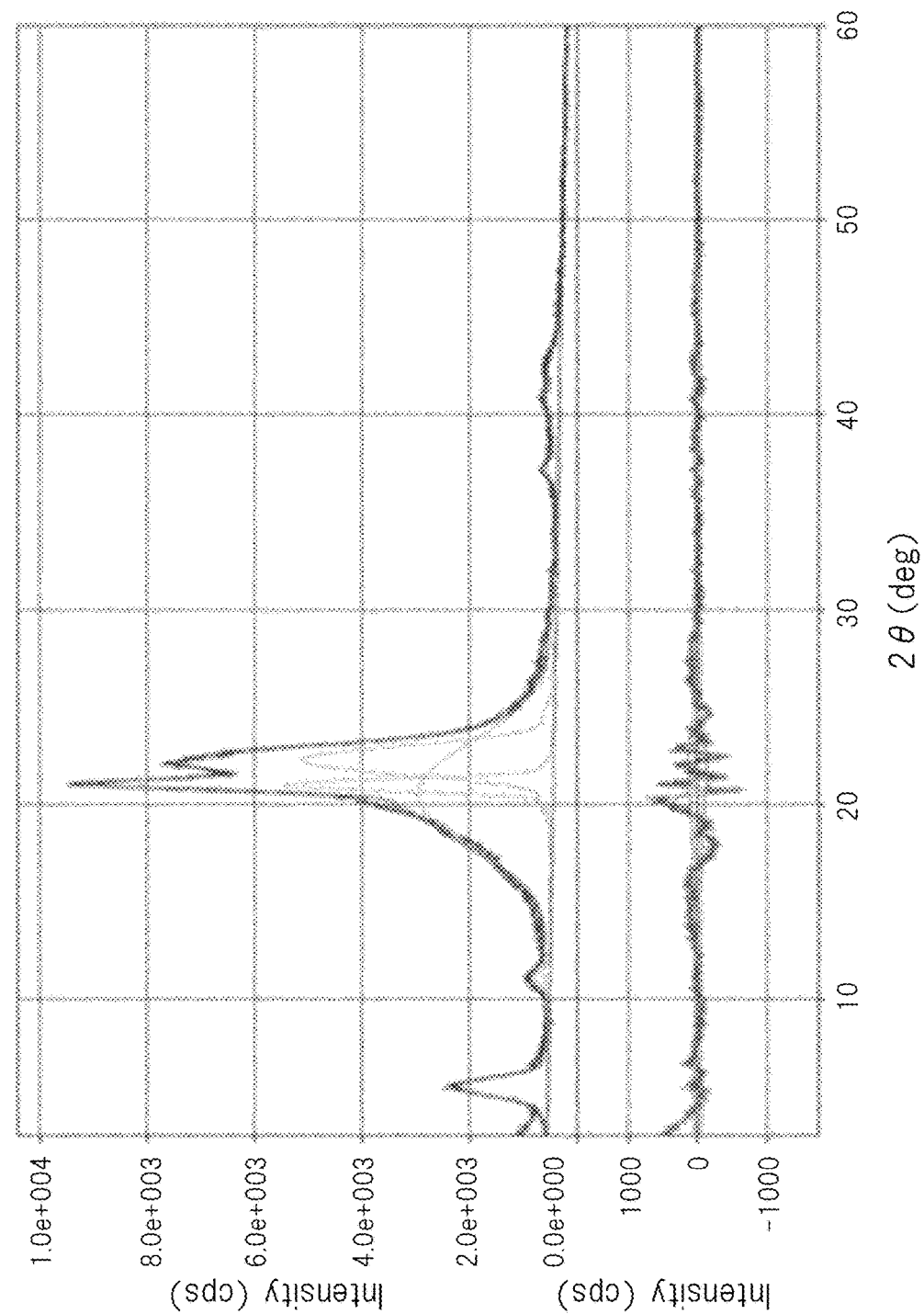

[Fig. 8]
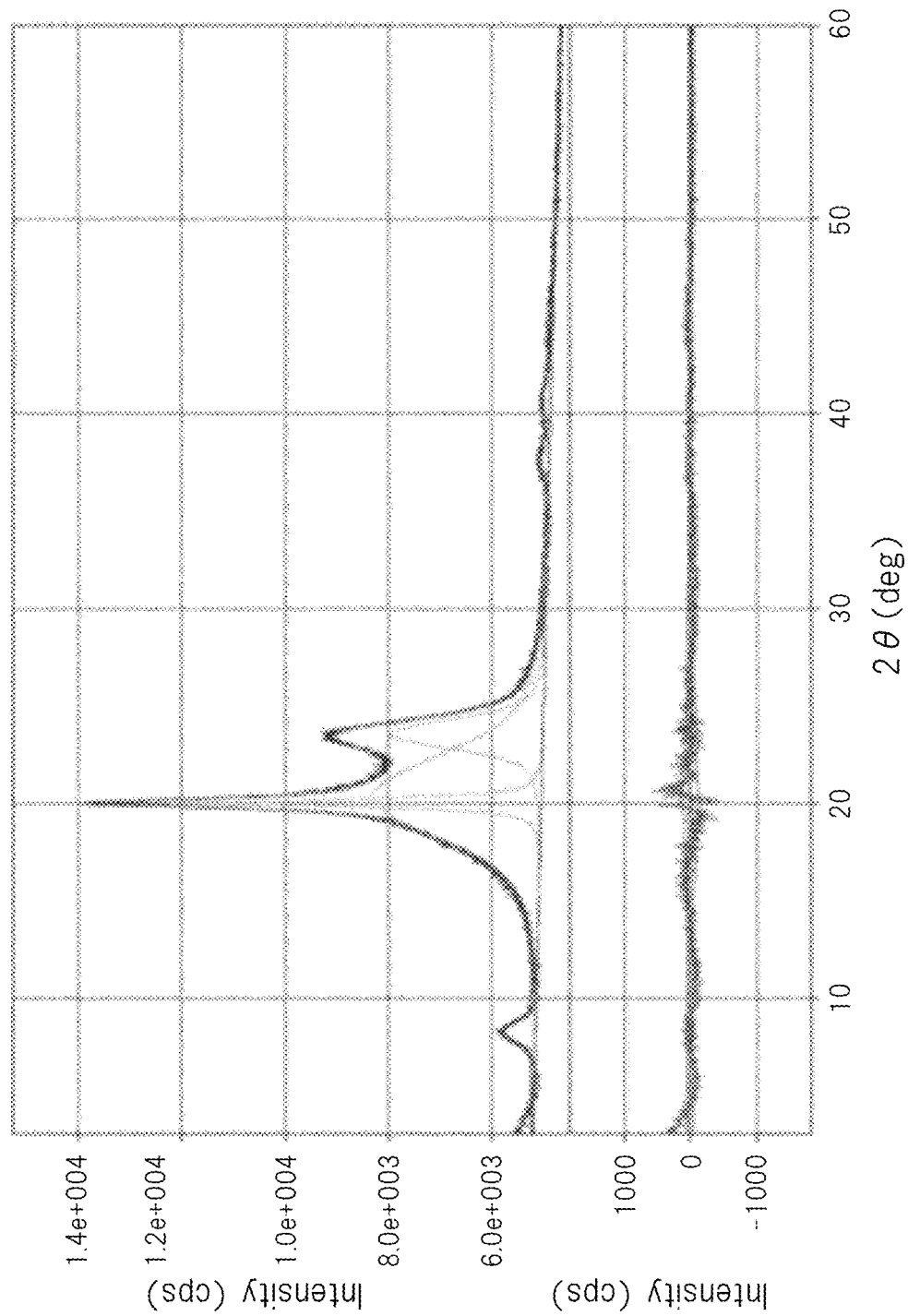

[Fig. 9]
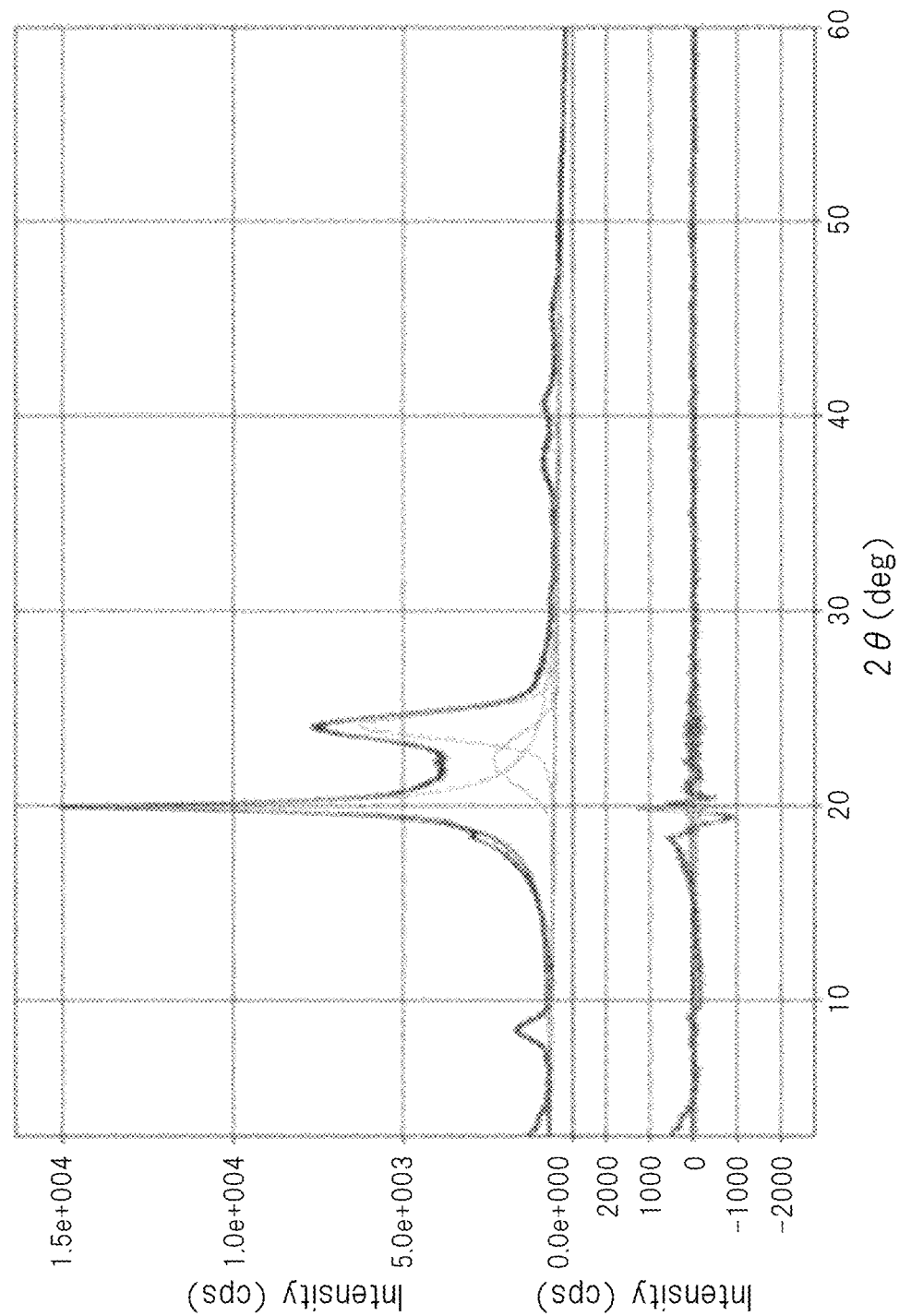

FIBER-REINFORCED RESIN, PROCESS FOR PRODUCING SAME, AND MOLDED ARTICLE

TECHNICAL FIELD

The present invention relates to resin compositions containing reinforcing fibers, processes for producing the same, and molded articles (or fiber-reinforced composites) containing the resin compositions.

BACKGROUND ART

Carbon-fiber-reinforced plastics (CFRPs), which contains carbon fibers and matrix resins, have excellent strength, stiffness, or other characteristics and are used for various applications, for example, primary structure members of flying machines, automotive members, windmill blades, and chassis for various electronic machines. For such applications, particularly important physical properties mainly include physical strength, for example, impact strength, elastic modulus, flexural strength, and interlaminar toughness. In order to improve such physical properties, it is being devised to add a variety of fillers to a CFRP containing a matrix resin (for example, an epoxy resin component) and a carbon fiber. In particular, reinforcement of CFRP using polyamide fine particles is now being investigated variously.

Japanese Patent Application Laid-Open Publication No. 2014-145003 (JP-2014-145003A, Patent Document 1) discloses a pre-preg (an intermediate material for molding) containing a reinforcing fiber, an epoxy resin, and two kinds of polymer particles with different average particle sizes; of the polymer particles, a larger polymer particle having an average particle size of 10 to 30 µm has a glass transition temperature of 80 to 180° C. In working examples of this document, a polyamide fine particle is prepared by chemical pulverization in which a polyamide is dissolved in a solvent and then a poor solvent is added to the resulting solution to give a precipitate.

Japanese Patent No. 5655976 (JP-5655976B, Patent Document 2) discloses a pre-preg which consists of a composition containing a reinforcing fiber, a thermosetting resin, a crystalline polyamide, and an amorphous polyamide, wherein the composition contains a particle having a specific dynamic storage modulus and a glass transition temperature of 80 to 180° C. In working examples of this document, a polyamide fine particle is prepared by chemical pulverization in which a crystalline polyamide and an amorphous polyamide are dissolved in a solvent and then a poor solvent is added to the resulting solution to give a precipitate.

WO2015/033998 pamphlet (Patent Document 3) discloses, as a composition for a fiber-reinforced composite utilizable as a pre-preg, a composition containing a reinforcing fiber, a globular polyamide resin particle having an average particle size of 12 to 70 µm, and a matrix resin. In working examples of this document, a polyamide resin particle is prepared by forced emulsification in which a polyamide is melt-kneaded using a material incompatible with the polyamide.

Unfortunately, these polyamide particles fail to sufficiently improve a reinforcing effect by the reinforcing fiber. Further, the polyamide particles described in Patent Document 2, which contain two kinds of polyamide particles, need homogeneous mixing, and this results in difficult handling.

CITATION LIST

Patent Literature

Patent Document 1: JP-2014-145003A (claim 1 and Examples)
Patent Document 2: JP-5655976B (Claims and Examples)
Patent Document 3: WO2015/033998 pamphlet (Claims and Examples)

SUMMARY OF INVENTION

Technical Problem

It is therefore an object of the present invention to provide a resin composition in which a reinforcing effect by a reinforcing fiber (in particular, a carbon fiber) is improved, a process for producing the resin composition, and a molded article containing the resin composition.

Another object of the present invention is to provide a resin composition which is easy to handle and easily improves an interlaminar toughness of a CFRP, a process for producing the resin composition, and a molded article containing the resin composition.

Solution to Problem

The inventors of the present invention focused attention on thermal characteristics of resin fine particles to achieve the above objects. Specifically, in a production process of a CFRP, although a fine particle added is exposed under an environment of a temperature beyond 150° C. over a long period of time by a curing reaction of an epoxy resin and is chemically influenced by the epoxy resin or a curing agent during the curing reaction, a polyamide fine particle itself to be used for reinforcing the CFRP has been hardly examined for the thermal characteristics. For example, in each of Patent Documents 1 and 2, the polyamide resin is examined for the glass transition temperature or the temperature dependency of dynamic storage modulus G'. However, these characteristics are characteristics of the polyamide resin itself constituting fine particle and not those of the fine particle. In particular, for a semicrystalline resin such as the polyamide resin constituting the fine particle, when the resin is cooled and solidified after melting by heat, the molecular higher-order structure (e.g., degree of crystallinity) after the solidification significantly varies depending on the thermal hysteresis (in particular, heating by drying) of the resin after the solidification. Although such a difference in higher-order structure greatly affects a reinforcing effect by the resin fine particle in the CFRP, these respects have not been examined in the conventional art. For example, Patent Document 3 fails to describe a heat treatment to the obtained polyamide resin fine particle. A person with ordinary skill in the art usually heats the polyamide resin fine particle at a temperature as high as possible to improve the production efficiency, that is, at a temperature not lower than the glass transition temperature of the polymer, in drying for removing a solvent. Accordingly, it has been found that the resin particle produced by forced emulsification in Patent Document 3 is crystallized by heating for drying and has an insufficient reinforcing effect on the CFRP.

For reinforcement, a fine particle may be added to a thermoplastic resin or other resins, without limitation to the CFRP. The reason for the addition is that an extension energy of cracks generated in the matrix due to impact or other causes is absorbed by an energy for destroying the interface between the fine particle and the matrix or an energy for deforming or destroying the fine particle. Thus, usually there is preferably a sufficient affinity between the fine particle to be added and the matrix resin. On the contrary, there is preferably no gap or others therebetween. Moreover, the destructive mode of the fine particle itself is preferably not brittle but ductile. These tendencies each are strongly related to the higher-order structure (e.g., degree of crystallinity) of the fine particle itself. However, at present, such an examination has not been made.

In these circumstances, the inventors of the present invention made intensive studies to achieve the above objects and finally found the following: as a resin particle to be added to a composition containing a matrix resin and a reinforcing fiber, use of a fine particle having a low degree of crystallinity so that a crystallization peak may be observed in a first heating (1st Heat) process of a differential scanning calorimetric analysis (DSC) effectively improves a reinforcing effect by the reinforcing fiber (particularly, a carbon fiber). The present invention was accomplished based on the above findings.

Representative examples of the method for producing the resin particle may include (1) a cryogenic pulverization (for example, a method that comprises cooling and embrittling a resin with liquid nitrogen or other means and then pulverizing or crushing the resin by a physical force to give a particle (or a powder)), (2) a chemical pulverization (for example, a method that comprises dissolving a resin in a solvent and then adding the resulting solution to a poor solvent for precipitation), (3) a polymerization (for example, a method that comprises polymerizing a raw material by suspension polymerization or emulsion polymerization to give a particle), (4) a forced emulsification {for example, a method that comprises melt-kneading a resin and a material incompatible with the resin [e.g., a water-soluble material, such as a water-soluble polymer (such as a poly(ethylene glycol)) or a saccharide (such as a polysaccharide or an oligosaccharide)] to give a dispersion containing a resin particle dispersed in the incompatible material (water-soluble polymer) and then removing the incompatible material from the dispersion}, and (5) a laser method (a method that comprises instantaneously melting a fibrous resin by laser and flying the resin in a decompression bath or others to give a resin particle). The inventors of the present invention also found that a specific fine particle having a low crystallinity is produced by preparing a particle using the forced emulsification selected from these methods and adjusting a thermal history (in particular, a drying condition) of the resulting particle to a specified condition.

Further, regarding the resin constituting the fine particle, an amorphous resin fine particle naturally has a lower degree of crystallinity than that of a semicrystalline resin fine particle. An amorphous resin that can maintain a shape thereof at 150 to 190° C. being a curing condition of an epoxy resin has an extremely high glass transition temperature and is brittle in a temperature range from a room temperature to about 100° C. Thus, the amorphous resin fails to achieve a sufficient reinforcing effect. Accordingly, the inventors of the present invention found that it is necessary that a resin capable of improving a reinforcing effect be a semicrystalline resin and be a resin having a low degree of crystallinity as a fine particle.

That is, an aspect of the present invention provides a resin composition comprising (A) a reinforcing fiber, (B) a resin particle, and (C) a matrix resin; the reinforcing fiber (A) contains a carbon fiber, the resin particle (B) contains a semicrystalline thermoplastic resin, the semicrystalline thermoplastic resin in the resin particle (B) (the resin particle (B)) has an exothermic peak in a temperature range between a glass transition temperature of the semicrystalline thermoplastic resin (the resin particle (B)) and a melting point of the semicrystalline thermoplastic resin (the resin particle (B), the exothermic peak being determined by heating the resin particle (B) at a rate of 10° C./min. by differential scanning calorimetry (DSC), and the resin particle (B) has an average particle size of 3 to 40 µm. The semicrystalline thermoplastic resin may be a polyamide resin having a melting point of not lower than 150° C. (in particular, a polyamide resin having an alicyclic structure and a glass transition temperature of not lower than 100° C., or an aliphatic polyamide resin having a γ-type crystal structure). The semicrystalline thermoplastic resin may be a polyamide resin having a γ-type crystal structure or a degree of crystallinity of not more than 50% (in particular, an aliphatic polyamide resin). The resin particle (B) may further contain an impact modifier. The matrix resin (C) may be a thermosetting resin. The resin particle (B) may have a spherical shape and an average particle size of 15 to 25 µm.

Another aspect of the present invention provides a process for producing the resin composition; the process comprises a resin particle production step which comprises melt-kneading a semicrystalline thermoplastic resin and an aqueous medium incompatible with the resin to a melt-kneaded product and removing the aqueous medium from the melt-kneaded product with a hydrophilic solvent to give (B) a resin particle, and an impregnation step for impregnating (A) a reinforcing fiber with the resulting resin particle (B) and (C) a matrix resin. In the resin particle production step, after the aqueous medium is removed, the resulting product may be dried at a temperature of not higher than (Tg+40)° C., wherein Tg represents a glass transition temperature of the semicrystalline thermoplastic resin.

Still another aspect of the present invention provides a molded article containing the resin composition.

Still another aspect of the present invention provides an additive for a composition comprising (A) a reinforcing fiber containing a carbon fiber and (C) a matrix resin to increase or improve a reinforcing effect of the reinforcing fiber (A); the additive contains (B) a resin particle, the resin particle (B) contains a semicrystalline thermoplastic resin, the semicrystalline thermoplastic resin in the resin particle (B) has an exothermic peak in a temperature range between a glass transition temperature of the semicrystalline thermoplastic resin and a melting point of the semicrystalline thermoplastic resin (the resin particle (B), the exothermic peak being determined by heating the resin particle (B) at a rate of 10° C./min. by differential scanning calorimetry (DSC), and the resin particle (B) has an average particle size of 3 to 40 µm.

Advantageous Effects of Invention

According to the present invention, combination of a resin particle having a specific degree of crystallinity with a carbon fiber and a matrix resin improves a reinforcing effect by a reinforcing fiber (in particular, a carbon fiber). In particular, a resin composition, a process producing the resin composition, and a molded article containing the resin composition are provided. In particular, simple impregnation of a resin particle having thermal characteristics measured and controlled using DSC and a matrix resin with a reinforcing fiber easily improves the interlaminar toughness of a CFRP and allows easy handling.

BRIEF DESCRIPTION OF DRAWINGS

FIG. 1 is a curve showing heat absorption in raising the temperature of an alicyclic polyamide particle obtained in Example 1 at a rate of 10° C./min. by a differential scanning calorimeter (DSC).

FIG. 2 is a curve showing heat absorption in raising the temperature of an alicyclic polyamide particle obtained in Comparative Example 1 at a rate of 10° C./min. by a DSC.

FIG. 3 is a wide-angle X-ray diffraction chart of alicyclic polyamide particles obtained in Example 1 and Comparative Example 1.

FIG. 4 is a curve showing heat absorption in raising the temperature of a polyamide 12 particle obtained in Example 2 at a rate of 10° C./min. by a DSC.

FIG. 5 is a wide-angle X-ray diffraction chart of a polyamide 12 particle obtained in Example 2.

FIG. 6 is a curve showing heat absorption in raising the temperature of a polyamide 12 particle obtained in Comparative Example 3 at a rate of 10° C./min. by a DSC.

FIG. 7 is a wide-angle X-ray diffraction chart of a polyamide 12 particle obtained in Comparative Example 3.

FIG. 8 is a wide-angle X-ray diffraction chart of a polyamide 1010 particle obtained in Example 3.

FIG. 9 is a wide-angle X-ray diffraction chart of a polyamide 1010 particle obtained in Comparative Example 4.

DESCRIPTION OF EMBODIMENTS

[Resin Composition]

The resin composition of the present invention comprises (A) a reinforcing fiber, (B) a resin particle, and (C) a matrix resin (a matrix-forming resin). The resin composition, which can be used as a composition for obtaining a fiber-reinforced composite (or a fiber-reinforced resin) as described later, may also be referred to as a composition for a fiber-reinforced composite (or a composition for a fiber-reinforced resin).

(A) Reinforcing Fiber

The reinforcing fiber (strengthening fiber, fibrous reinforcing material, fibrous filler, fibrous filling material) (A) is a component that reinforces (or strengthens) a matrix resin and contains a carbon fiber. The carbon fiber may include, but should not be limited to, a pitch-based fiber, a polyacrylonitrile (PAN)-based carbon fiber, or other fibers. These carbon fibers may be used alone or in combination.

The reinforcing fiber (A) may further contain a non-carbon fiber in addition to the carbon fiber. The non-carbon fiber may include an inorganic fiber (for example, a glass fiber, a boron fiber, an aluminosilicate fiber, an aluminum oxide fiber, a silicon carbide fiber, a metal fiber, and a potassium titanate fiber), an organic fiber {for example, a polyester fiber [e.g., an aromatic polyester fiber (e.g., a poly(alkylene arylate) fiber such as a poly(ethylene terephthalate) fiber)], a polyamide fiber [e.g., an aromatic polyamide fiber (e.g., an aramid fiber)], and a regenerated fiber (e.g., a rayon)}. These non-carbon fibers may be used alone or in combination.

For a combination of the carbon fiber and the non-carbon fiber (for example, a glass fiber, an organic fiber), the proportion of the carbon fiber in the whole reinforcing fiber may be, for example, not less than 30% by volume, preferably not less than 50% by volume, and more preferably not less than 70% by volume (in particular, not less than 90% by volume) or may be 100% by volume (the carbon fiber alone).

The reinforcing fiber (A) may be surface-treated.

The reinforcing fiber (A) may have an average diameter selected, depending on the species thereof, from a range of about 0.5 to 1000 μm (e.g., about 1 to 500 μm). For example, the reinforcing fiber may have an average diameter of about 1 to 300 μm (e.g., about 2 to 100 μm), preferably about 3 to 70 μm, more preferably about 5 to 50 μm (e.g., about 5 to 30 μm).

In particular, the carbon fiber may have an average diameter (average fiber diameter) of, for example, about 1 to 100 μm (e.g., about 1.5 to 70 μm), preferably about 2 to 50 μm (e.g., about 2.5 to 40 μm), more preferably about 3 to 30 μm, particularly about 5 to 20 μm (e.g., about 6 to 15 μm), and usually about 5 to 15 μm (e.g., about 7 to 10 μm).

In the present invention, the fiber diameter can be measured by a common method. For example, the fiber diameter can be determined by measuring fiber diameters of 10 or more fibers with an electron microscope and calculating the average of the measured values.

The reinforcing fiber (A) may be either a short fiber or a long fiber. In particular, the reinforcing fiber may be a long fiber. The long fiber may be either a continuous fiber or a discontinuous fiber or may be combination of a continuous fiber and a discontinuous fiber.

The reinforcing fiber (A) may be used to form a fabric (or a cloth or a textile). The fabric (fiber assembly) may include, for example, a woven fabric (a woven product), a nonwoven fabric, and a knit fabric (a knit product). The reinforcing fibers (A) may be contained in the composition, which comprises the resin particle (B) and the matrix resin (C), in an embodiment that the reinforcing fibers are arranged in the same direction (or one direction) as described later.

The structure of the cloth can suitably be selected according to the species of the cloth. For example, the structure of the woven fabric (woven construction) may include, but should not be limited to, a plain weave, a twill weave, a satin weave, or other structures. The structure of the knit fabric (knit construction) may include a warp knit (for example, a tricot), a weft knit (for example, a plain stitch and a Tuck stitch), or other structures.

(B) Resin Particle (Semicrystalline Thermoplastic Resin Particle)

The resin component constituting the resin particle (B) comprises a semicrystalline thermoplastic resin. The semicrystalline thermoplastic resin is not limited to a particular resin and is any resin that can improve (or assist) the reinforcing effect by the reinforcing fiber. For example, the thermoplastic resin may include a polyamide resin, a polyester resin [for example, an aromatic polyester resin such as a poly(ethylene terephthalate)], a polyacetal resin, a polysulfide resin, a polysulfone resin (including a polyethersulfone resin), a polyetherketone resin, and a polyolefin resin. These semicrystalline thermoplastic resins may be used alone or in combination.

Among them, in combination with an epoxy resin as the matrix resin, the polyamide resin is preferred considering effective and easy exertion of the reinforcing effect. For example, the polyamide resin may include an aliphatic polyamide resin, an alicyclic polyamide resin, and an aromatic polyamide resin. The polyamide resin may be a homopolyamide or a copolyamide. The polyamide resin may have any terminal group without limitation. The terminal group may be an amino group, a carboxyl group, or an acid anhydride group.

Among the aliphatic polyamide resins, the homopolyamide may include a homo- or co-polyamide of an aliphatic diamine component and an aliphatic dicarboxylic acid component, a homo- or co-polyamide of a lactam or an aminocarboxylic acid, and a copolyamide of a first amide-forming component of an aliphatic diamine component and an aliphatic dicarboxylic acid component and a second amide-forming component of a lactam or an aminocarboxylic acid. Examples of the aliphatic diamine component may include an alkanediamine, for example, a $C_{4-16}$ alkylenediamine such as tetramethylenediamine, hexamethylenediamine, or dodecanediamine, preferably a $C_{6-14}$ alkylenediamine, and more preferably a $C_{6-12}$ alkylenediamine. Examples of the aliphatic dicarboxylic acid component may include an alkanedicarboxylic acid, for example, a $C_{4-20}$alkanedicarboxylic acid such as adipic acid, sebacic acid, or dodecanedioic acid, preferably a $C_{5-18}$ alkanedicarboxylic acid, and more preferably a $C_{6-16}$ alkanedicarboxylic acid. Examples of the lactam may include, for example, a lactam having about 4 to 20 (preferably about 4 to 16) carbon atoms, such as ε-caprolactam or ω-laurolactam. Examples of the aminocarboxylic acid may include, for example, a $C_{4-20}$aminocarboxylic acid such as ω-aminoundecanoic acid, preferably a $C_{4-16}$aminocarboxylic acid, and more preferably a $C_{6-14}$aminocarboxylic acid.

Concrete examples of the aliphatic polyamide resin may include a polyamide 6, a polyamide 11, a polyamide 12, a polyamide 46, a polyamide 66, a polyamide 610, a polyamide 611, a polyamide 612, a polyamide 613, a polyamide 1010, a polyamide 1012, a polyamide 66/11, a polyamide 66/12, a polyamide 6/12/612, or others.

The alicyclic polyamide resin may include, for example, a homopolyamide or copolyamide containing as a constituent at least one member selected from the group consisting of an alicyclic diamine component and an alicyclic dicarboxylic acid component. For example, as the alicyclic polyamide resin, there may be used an alicyclic polyamide which contains an alicyclic diamine and/or an alicyclic dicarboxylic acid as at least one of diamine components and dicarboxylic acid components. In particular, as the diamine component and the dicarboxylic acid component, combination use of the above-exemplified aliphatic diamine component and/or aliphatic dicarboxylic acid component with the alicyclic diamine component and/or alicyclic dicarboxylic acid component is preferred. Such an alicyclic polyamide resin, which has a high transparency, is known as what is called a transparent polyamide.

The alicyclic diamine component may include a diaminocycloalkane such as diaminocyclohexane (e.g., a diamino $C_{5-10}$cycloalkane); and a bis(aminocycloalkyl)alkane such as bis(4-aminocyclohexyl)methane, bis(4-amino-3-methylcyclohexyl)methane, or 2,2-bis(4'-aminocyclohexyl)propane [e.g., a bis(amino$C_{5-8}$cycloalkyl)$C_{1-3}$alkane]; a hydrogenated xylylenediamine; or other components. The alicyclic diamine component may have a substituent such as an alkyl group (a $C_{1-6}$alkyl group such as methyl group or ethyl group, preferably a $C_{1-4}$alkyl group, and more preferably a $C_{1-2}$alkyl group). The alicyclic dicarboxylic acid may include a cycloalkanedicarboxylic acid such as 1,4-cyclohexanedicarboxylic acid or 1,3-cyclohexanedicarboxylic acid (e.g., a $C_{5-10}$cycloalkane-dicarboxylic acid), or other compounds.

Representative examples of the alicyclic polyamide resin may include a condensation product of an alicyclic diamine component [e.g., a bis(aminocyclohexyl)alkane] and an aliphatic dicarboxylic acid component [e.g., an alkanedicarboxylic acid (e.g., a $C_{4-20}$alkane-dicarboxylic acid component)].

The aromatic polyamide resin may include a polyamide in which at least one of an aliphatic diamine component and an aliphatic dicarboxylic acid component in an aliphatic polyamide resin is an aromatic component, for example, a polyamide in which a diamine component is an aromatic diamine component [for example, a condensation product (e.g., MXD-6) of an aromatic diamine (e.g., m-xylylenediamine) and an aliphatic dicarboxylic acid], and a polyamide in which a dicarboxylic acid component is an aromatic component [for example, a condensation product of an aliphatic diamine (e.g., trimethylhexamethylenediamine) and an aromatic dicarboxylic acid (such as terephthalic acid or isophthalic acid)]. The aromatic polyamide resin may be a fully aromatic polyamide (aramid) in which a diamine component and a dicarboxylic acid component are aromatic components [e.g., a poly(m-phenyleneisophthalamide)].

These semicrystalline polyamide resins may be used alone or in combination. Among these resins, considering a more reinforcing effect on the matrix resin, a semicrystalline polyamide (a polyamide having a crystallinity) such as an alicyclic polyamide or an aliphatic polyamide (an alicyclic polyamide and/or an aliphatic polyamide) is preferred. In the respect that the resin particle (B) is easy to richly distribute on or near the reinforcing fiber (A), the alicyclic polyamide resin (a polyamide resin having an alicyclic structure) is particularly preferred.

The semicrystalline thermoplastic resin (in particular, the semicrystalline polyamide resin) may have a number average molecular weight of, for example, about 8000 to 200000, preferably about 9000 to 150000, and more preferably about 10000 to 100000. The number average molecular weight can be measured by gel permeation chromatography using a polystyrene or other substances as a standard substance, or other means.

The melting point of the semicrystalline thermoplastic resin (in particular, the semicrystalline polyamide resin) is not limited to a particular temperature. A polyamide resin having a relatively high melting point may preferably be used. Such a semicrystalline polyamide resin tends to maintain a spherical shape thereof at a high level in producing a composition or a molded article, and this probably contributes to efficiently obtaining the reinforcing effect by the reinforcing fiber (A). Such a semicrystalline polyamide resin (such as an aliphatic polyamide resin or an alicyclic polyamide resin) may have a melting point of, for example, not lower than 150° C. (e.g., about 155 to 350° C., preferably not lower than 160° C. (e.g., about 165 to 300° C.), and more preferably not lower than 170° C. (e.g., about 175 to 270° C.). The semicrystalline polyamide resin may have a melting point (or softening point) not lower than (or higher than) a molding temperature of the composition [for example, a curing temperature of a curable resin (e.g., an epoxy resin) as the matrix resin]. A semicrystalline polyamide resin having an excessively high melting point may fail to improve the reinforcing effect by the reinforcing fiber (A).

The semicrystalline thermoplastic resin (in particular, the semicrystalline polyamide resin) may have a glass transition temperature of, for example, not lower than 30° C. (for example, about 40 to 200° C.). In particular, the alicyclic polyamide resin may have a glass transition temperature of not lower than 100° C. (for example, about 105 to 200° C.), preferably not lower than 110° C. (for example, about 115 to 180° C.), and more preferably not lower than 120° C. (for example, about 125 to 150° C.); the aliphatic polyamide resin may have a glass transition temperature of not lower than 30° C. (for example, about 30 to 150° C.), preferably not lower than 40° C. (for example, about 40 to 120° C.), and more preferably not lower than 45° C. (for example, about 45 to 100° C.). A semicrystalline polyamide resin having an excessively high glass transition temperature may fail to improve the reinforcing effect by the reinforcing fiber (A).

The degree of crystallinity of the semicrystalline thermoplastic resin (in particular, the semicrystalline polyamide resin) can be selected according to the species of the resin, and may be not more than 80% (for example, 75 to 1%) and preferably not more than 50% (for example, 50 to 10%). In a case where the semicrystalline thermoplastic resin is an alicyclic polyamide resin, the alicyclic polyamide resin may have a degree of crystallinity of not more than 40%, and has a degree of crystallinity of, for example, about 30 to 1%, preferably about 20 to 1%, and more preferably about 20 to 5%. A semicrystalline aliphatic polyamide having a $C_{6-10}$alkane unit, such as a polyamide 1010, may have a degree of crystallinity of not more than 50%, and has a degree of crystallinity of, for example, about 50 to 1%, preferably about 45 to 10%, and more preferably about 43 to 30%. A semicrystalline aliphatic polyamide having a $C_{11-13}$alkane unit, such as a polyamide 12, may have a degree of crystallinity of not more than 80%, and has a degree of crystallinity of, for example, about 80 to 10%, preferably about 78 to 30%, and more preferably about 75 to 35%. A semicrystalline polyamide resin having an excessively high degree of crystallinity may fail to improve the reinforcing effect by the reinforcing fiber (A). According to the present invention, the degree of crystallinity can be measured by a conventional method, for example, X-ray diffraction, differential scanning calorimetry (DSC), particularly can be measured based on wide-angle X-ray diffraction (WAXD) as described in Examples mentioned below.

The resin particle (B) (the semicrystalline thermoplastic resin in the resin particle (B)) has an exothermic peak in a temperature range between the glass transition temperature of the resin particle (B) (the semicrystalline thermoplastic resin) and the melting point of the resin particle (B) (the semicrystalline thermoplastic resin) when the resin particle (B) is heated at a rate of 10° C./min. by differential scanning calorimetry (DSC). The exothermic peak is within the above-mentioned temperature range, and, for example, may be positioned at a temperature 1 to 70° C. higher than the glass transition temperature, or may be positioned at a temperature preferably about 1 to 60° C., more preferably about 1 to 50° C. (particularly about 1 to 40° C.) higher than the glass transition temperature. According to the present invention, probably because the resin particle (B) having such thermal characteristics (crystal structure) easily acts on the matrix resin (C) (in particular, a thermosetting resin such as an epoxy resin), the reinforcing effect by the reinforcing fiber (A) is improvable.

The crystal structure of the semicrystalline thermoplastic resin constituting the resin particle (B) is not particularly limited to a specific one. For example, the crystal structure of the semicrystalline polyamide resin may be any crystal structure of α-type, γ-type, and α+γ-type. Among them, the semicrystalline aliphatic polyamide resin (in particular, a semicrystalline aliphatic polyamide having a $C_{11-13}$alkane unit, such as a polyamide 12) preferably has a γ-type crystal structure. In the present description and claims, the crystal structure of the semicrystalline polyamide resin can be determined based on the presence or absence of peak(s) in a diffraction angle 2θ range of 15 to 30° in a wide-angle X-ray diffraction chart, as follows.

Amorphous structure or low-crystal structure: gentle mountain shape having no peak α-Type crystal structure: sharp mountain shape having two peaks γ-Type crystal structure: sharp mountain shape having one peak (for example, mountain shape having one peak at 2θ of 21.5°±0.2°)

α+γ-Type crystal structure: sharp mountain shape having three peaks composed of α-type two peaks and γ-type one peak existing between the α-type two peaks The resin particle (B) preferably has a spherical shape. The spherical shape may include a highly spherical shape or a substantially spherical shape [for example, a shape having a smooth surface (or having no uneven structure on a surface thereof) and having a major axis slightly longer than a minor axis (for example, a ratio of major axis/minor axis of about 1.3/1 to 1/1, preferably about 1.2/1 to 1/1, and more preferably about 1.1/1 to 1/1)]. In particular, the highly spherical shape is preferred. Moreover, since at the higher sphericity the specific surface area becomes smaller, the specific surface area may be used as an index of the sphericity (spherical shape) in the present description and claims. For example, in a case where the resin particle (B) has an average particle size of 20 μm, the resin particle (B) may have a BET specific surface area of, for example, not more than 1 m²/g, preferably not more than 0.5 m²/g, and more preferably not more than 0.4 m²/g. Incidentally, a resin particle having a specific gravity of 1.0 and an average particle size of 20 μm has a theoretical minimum specific surface area of 0.15 m²/g.

As the shape of the resin particle, an amorphous shape, a potato shape, a spherical shape, or other shapes are known. Such a shape is practically determined according to a method for producing the particle.

The resin particle (B) may have an average particle size (an average particle diameter) from a range of not less than 3 μm (for example, 3 to 85 μm). For example, the average particle size may be about 3 to 40 μm, preferably about 5 to 35 μm, and more preferably about 10 to 30 μm (particularly about 15 to 25 μm). A resin particle (B) having an extremely small average particle size may fail to improve the reinforcing effect by the reinforcing fiber (A). In the present invention, the average particle size is expressed as a number average primary particle size and can be measured by laser diffraction scattering method or other means.

The above range is a range of the average particle size, although, probably, a resin particle having a particle size within the above range of the average particle size mainly contributes to an efficient reinforcing effect. Accordingly, the resin particle (B) may comprise a resin particle having a particle size within the range of 3 to 40 μm (particularly 15 to 25 μm) at a proportion of not less than 50% (e.g., not less than 60%), preferably not less than 70%, more preferably not less than 80%, and particularly not less than 90% in the whole resin particle (B) on the basis of the number of particles.

The average particle size of the resin particle (B) can be selected according to the average diameter of the reinforcing fiber (A). For example, the average particle size of the resin particle (B) may be about 0.5 to 15 times (e.g., about 0.7 to 12 times), preferably about 1 to 10 times (e.g., about 1.5 to 5 times), and more preferably about 2 to 4 times (e.g., about 2.5 to 3.5 times) as large as the average diameter (average fiber diameter) of the reinforcing fiber (A) or may usually be about 1.5 to 15 times (e.g., about 2 to 10 times) as large as the average diameter (average fiber diameter) of the reinforcing fiber (A). A resin particle (B) having such a particle size tends to be richly distributed on or near (or around) the reinforcing fiber, easily achieving an efficiently increased reinforcing effect by the reinforcing fiber (A).

The resin particle (B) contains the semicrystalline thermoplastic resin, and may further contain an impact modifier.

The impact modifier may include, for example, a polyolefin resin modified with an acid (an acid-modified polyolefin resin) and a resin having an epoxy-group-containing group such as glycidyl group. These impact modifiers may be used alone or in combination. Among these impact modifiers, the acid-modified polyolefin resin is preferred, and the polyolefin resin may partly have a carbon-carbon double bond. The ratio of the impact modifier relative to 100 parts by weight of the semicrystalline thermoplastic resin is, for example, about 1 to 30 parts by weight, preferably about 1 to 25 parts by weight, and more preferably about 5 to 20 parts by weight.

The resin particle (B) may further contain another thermoplastic resin or a conventional additive as other component (s). Examples of the conventional additive may include a stabilizer, a filler (a nonfibrous filler), a coloring agent, a dispersing agent, a preservative, an antioxidant, and a defoaming agent. These other components may be used alone or in combination. The total ratio of these other components relative to 100 parts by weight of the semicrystalline thermoplastic resin may be, for example, not more than 10 parts by weight (e.g., about 0.01 to 10 parts by weight).

(C) Matrix Resin

The matrix resin (C) is a resin component that is a matrix of a composition containing the reinforcing fiber (A) [and the resin particle (B)], and can suitably be selected according to purposes or desired characteristics.

Such a matrix resin (C) contains a resin (a resin component). The resin, which can be selected according to purposes or desired characteristics or physical properties, may be a thermoplastic resin [for example, an acrylic resin, a polyolefin resin (e.g., a polypropylene), a polyamide resin (e.g., the above-exemplified polyamide resin), a polyester resin (e.g., an aromatic polyester resin such as a poly (ethylene terephthalate)), a polycarbonate resin, a poly(phenylene ether) resin, a poly(phenylene sulfide) resin, a polysulfone resin, a polyetherketone resin, a polyetheretherketone resin, a polyimide resin, and a polyetherimide resin] or a curable resin (a thermosetting or light-curable resin). The resins may be used alone or in combination.

In particular, according to the present invention, the thermosetting resin can preferably be used, from the point of view of strength or thermal characteristics, in combination with the resin particle (B). Thus, the matrix resin may contain a thermosetting resin.

The thermosetting resin may include, for example, an epoxy resin, an unsaturated polyester resin, a vinyl ester resin, an acrylic resin, a phenolic resin, a urea resin, a melamine resin, an aniline resin, a polyimide resin, and a bismaleimide resin. These thermosetting resins may be used alone or in combination.

Among these thermosetting resins, in particular, the epoxy resin is preferred. The epoxy resin may include, for example, a glycidyl ether-based epoxy resin, a glycidylamine-based epoxy resin (e.g., tetraglycidyldiaminodiphenylmethane, triglycidyl-p-aminophenol, triglycidylaminocresol, diglycidylaniline, and N,N-diglycidyl-4-glycidyloxyaniline), a glycidyl ester-based epoxy resin [for example, a diglycidyl ester of a dicarboxylic acid (e.g., an aromatic dicarboxylic acid or a hydrogenated product thereof, such as terephthalic acid, isophthalic acid, phthalic acid, tetrahydrophthalic acid, or hexahydrophthalic acid)], an alkene oxide (e.g., vinylcyclohexene dioxide), and triglycidyl isocyanurate.

The glycidyl ether-based epoxy resin may include, for example, an epoxy resin (polyglycidyl ether) having an aromatic skeleton and an epoxy resin (polyglycidyl ether) having an aliphatic skeleton. Examples of the epoxy resin having an aromatic skeleton may include a bisphenol-based epoxy resin [a reaction product of a bisphenol or an alkylene oxide adduct thereof and epichlorohydrin (such as a bisphenol A-based epoxy resin, a bisphenol F-based epoxy resin, a bisphenol S-based epoxy resin, or a brominated bisphenol-based epoxy resin)], a phenol-based epoxy resin (e.g., a phenol novolac epoxy resin, a cresol novolac epoxy resin, a naphthol novolac epoxy resin, a bisphenol A novolac epoxy resin, a bisphenol F novolac epoxy resin, a biphenyl skeleton-containing phenol novolac resin, and a xylylene skeleton-containing phenol novolac resin), a dicyclopentadiene-based epoxy resin, and a glycidyl ether having a naphthalene skeleton [for example, a di(glycidyloxy)naphthalene such as 1,5-di(glycidyloxy)naphthalene, and bis[2,7-di(glycidyloxy)naphthyl]methane]. Examples of the epoxy resin having an aliphatic skeleton may include an alkanediol diglycidyl ether (e.g., a $C_{2-10}$ alkanediol diglycidyl ether such as butanediol diglycidyl ether, neopentyl glycol diglycidyl ether, or 1,6-hexanediol diglycidyl ether), a polyalkanediol diglycidyl ether (e.g., a poly$C_{2-4}$ alkanediol diglycidyl ether such as polypropylene glycol diglycidyl ether), and a di- to hexa-glycidyl ether of an alkanetri- to hexa-ol (e.g., a di- or tri-glycidyl ether of a $C_{3-10}$ alkanetri- or tetra-ol, such as trimethylolpropane di- or tri-glycidyl ether, or glycerin di- or tri-glycidyl ether).

For the alkylene oxide adduct of the bisphenol, the mole number of alkylene oxides added to 1 mol of hydroxyl groups of the bisphenol may be, for example, not less than 1 mol (e.g., about 1 to 20 mol), preferably about 1 to 15 mol, and more preferably about 1 to 10 mol.

These epoxy resins may be used alone or in combination. Among these epoxy resins, the epoxy resin having an aromatic skeleton, for example, a bisphenol-based epoxy resin, is preferred in light of strength or other characteristics. Thus, the epoxy resin may comprise at least an epoxy resin having an aromatic skeleton or may comprise an epoxy resin having an aromatic skeleton and another epoxy resin (for example, an epoxy resin having an aliphatic skeleton) in combination.

The epoxy resin may further comprise a monofunctional epoxy compound (or a diluent) {for example, a monoglycidyl ether [e.g., an alkyl glycidyl ether (e.g., 2-ethylhexyl glycidyl ether), an alkenyl glycidyl ether (e.g., allyl glycidyl ether), an aryl glycidyl ether (e.g., phenyl glycidyl ether)], and an alkene oxide (such as octylene oxide or styrene oxide)}. For combination of the epoxy resin and the monofunctional epoxy compound, the ratio of the epoxy resin relative to the monofunctional epoxy compound [the former/the latter (weight ratio)] may be, for example, about 99/1 to 50/50, preferably about 97/3 to 60/40, and more preferably about 95/5 to 70/30.

The epoxy resin (or a composition containing the epoxy resin and the monofunctional epoxy compound) may be solid or liquid at a room temperature (e.g., about 20 to 30° C.). The liquid epoxy resin may have a viscosity (at 25° C.) of, for example, about 50 to 50000 mPa·s, preferably about 100 to 40000 mPa·s (e.g., about 200 to 35000 mPa·s), and more preferably about 300 to 30000 mPa·s (e.g., about 500 to 25000 mPa·s) or may have a viscosity (at 25° C.) of not lower than 1000 mPa·s (e.g., about 2000 to 50000 mPa·s, preferably about 3000 to 30000 mPa·s, and more preferably about 5000 to 25000 mPa·s).

In a case where the resin comprises a thermosetting resin, the matrix resin may further contain a curing agent or a curing accelerator. Specifically, the matrix resin may comprise a resin (a thermosetting resin) and a curing agent or a curing accelerator for the resin.

The curing agent can suitably be selected according to the species of the resin. For example, in a case where the resin is an epoxy resin, the curing agent may include, for example, an amine-based curing agent, a phenolic resin-based curing agent (e.g., a phenol novolac resin and a cresol novolac resin), an acid anhydride-based curing agent [e.g., an aliphatic dicarboxylic anhydride (such as dodecenylsuccinic anhydride), an alicyclic dicarboxylic anhydride (such as tetrahydrophthalic anhydride, methyltetrahydrophthalic anhydride, or hexahydrophthalic anhydride), and an aromatic dicarboxylic anhydride (such as phthalic anhydride, trimelliticanhydride, pyromelliticanhydride, or benzophenonetetracarboxylic anhydride)], a polymercaptan-based curing agent, and a latent curing agent (such as boron trifluoride-amine complex, dicyandiamide, or a carbohydrazide).

The amine-based curing agent may include, for example, an aromatic amine-based curing agent, an aliphatic amine-based curing agent, an alicyclic amine-based curing agent, and an imidazole compound or a salt thereof (e.g., a formate, a phenol salt, a phenol novolac salt, and a carbonate). Examples of the aromatic amine-based curing agent may include a polyaminoarene (e.g., a diaminoarene such as p-phenylenediamine or m-phenylenediamine), a polyaminoalkylarene (e.g., a diamino-alkylarene such as diethyltoluenediamine), a poly(aminoalkyl)arene [e.g., a di(aminoalkyl)arene such as xylylenediamine], a poly(aminoaryl)alkane [e.g., a di(aminoaryl)alkane such as diaminodiphenylmethane], a poly(amino-alkylaryl)alkane [e.g., a di(amino-alkylaryl)alkane such as 4,4'-methylenebis(2-ethyl-6-methylaniline)], a bis(aminoarylalkyl)arene {e.g., 1,3-bis[2-(4-aminophenyl)-2-propyl]benzene and 1,4-bis[2-(4-aminophenyl)-2-propyl]benzene}, a di(aminoaryl) ether (e.g., diaminodiphenyl ether), a di(aminoaryloxy)arene [e.g., 1,3-bis(3-aminophenoxy)benzene], and a di(aminoaryl) sulfone (e.g., diaminodiphenyl sulfone). Examples of the aliphatic amine-based curing agent may include ethylenediamine, hexamethylenediamine, diethylenetriamine, triethylenetetramine, tetraethylenepentamine, and diethylaminopropylamine. Examples of the alicyclic amine-based curing agent may include menthenediamine, isophoronediamine, bis(4-amino-3-methylcyclohexyl)methane, 3,9-bis(3-aminopropyl)-2,4,8,10-tetraoxaspiro[5.5]undecane, and norbornanediamine. Examples of the imidazole compound may include an alkylimidazole such as 2-methylimidazole, 2-phenylimidazole, 2-heptadecylimidazole, or 2-ethyl-4-methylimidazole; and an arylimidazole such as 2-phenylimidazole, 2-phenyl-4-methylimidazole, 2-phenyl-4-methyl-5-hydroxymethylimidazole, or 1-benzyl-2-phenylimidazole.

The curing agents may be used alone or in combination. The curing agent can also act as a curing accelerator.

Among them, in particular, the amine-based curing agent (for example, an aromatic amine-based curing agent) may preferably be used.

The ratio of the curing agent can suitably be selected according to the species of the epoxy resin (e.g., epoxy equivalent), the species of the curing agent, or others. For example, the ratio of the curing agent relative to 100 parts by weight of the epoxy resin may be about 0.1 to 300 parts by weight, preferably about 1 to 250 parts by weight, more preferably about 3 to 200 parts by weight (e.g., about 4 to 150 parts by weight), and particularly about 5 to 100 parts by weight.

The curing accelerator can also suitably be selected according to the species of the resin. For example, in a case where the resin comprises an epoxy resin, the curing accelerator may include, for example, a phosphine compound (e.g., ethylphosphine, propylphosphine, trialkylphosphine, phenylphosphine, and triphenylphosphine) and an amine compound (e.g., a secondary to tertiary amine such as triethylamine, piperidine, benzyldimethylamine, triethanolamine, dimethylaminoethanol, triethylenediamine, tris(dimethylaminomethyl)phenol or N,N-dimethylpiperazine, or a salt thereof). The curing accelerators may be used alone or in combination.

The ratio of the curing accelerator can suitably be selected according to the species of the curing agent, or others. For example, the ratio of the curing accelerator relative to 100 parts by weight of the epoxy resin may be about 0.01 to 100 parts by weight, preferably about 0.05 to 50 parts by weight, and more preferably about 1 to 30 parts by weight.

In the composition (or the molded article described later) of the present invention, the proportion of the resin particle (B) in the total amount of the resin particle (B) and the matrix resin (C) (when the matrix resin contains a curing agent and/or a curing accelerator, the amount of the matrix resin (C) means the total amount of the resin and the curing agent and/or the curing accelerator) can be selected from a range of not more than 50% by weight (e.g., about 0.1 to 40% by weight) or may, for example, be not more than 30% by weight (e.g., about 0.5 to 25% by weight), preferably not more than 20% by weight (e.g., about 1 to 18% by weight), and more preferably not more than 15% by weight (e.g., about 2 to 12% by weight) or may be not more than 10% by weight (e.g., about 0.5 to 8% by weight, and preferably about 1 to 5% by weight).

In the composition (or the molded article described later) of the present invention, the proportion of the resin particle (B) in the total amount of the resin particle (B) and the matrix resin (C) (when the matrix resin contains a curing agent and/or a curing accelerator, the amount of the matrix resin (C) means the total amount of the resin and the curing agent and/or the curing accelerator) can be selected from a range of not more than 30% by volume (e.g., about 0.01 to 25% by volume) or may, for example, be not more than 20% by volume (e.g., about 0.1 to 15% by volume), preferably not more than 10% by volume (e.g., about 0.3 to 8% by volume), and more preferably not more than 5% by volume (e.g., about 0.5 to 3% by volume).

According to the present invention, the reinforcing effect by the reinforcing fiber is sufficiently obtainable if the proportion of the resin particle (B) is low.

In the composition (or the molded article described later) of the present invention, the ratio of the total amount of the resin particle (B) and the matrix resin (C) relative to 100 parts by weight of the reinforcing fiber (A) may be, for example, about 1 to 70 parts by weight, preferably about 2 to 50 parts by weight, and more preferably about 3 to 30 parts by weight.

The composition of the present invention may optionally contain any other component that does not damage the effects of the present invention. Such a component can suitably be selected as usage or others. For example, the component may include a stabilizer, a filler (a non-fibrous filler), a coloring agent, a dispersing agent, a preservative, an antioxidant, and a defoaming agent. These components may be used alone or in combination.

The composition of the present invention may contain an electroconductive particle or may usually be free from an electroconductive particle.

(Form of Composition)

The form of the composition of the present invention comprises the reinforcing fiber (A), the resin particle (B), and the matrix resin (C) (and optionally other components, the same applies hereinafter). The composition may usually be in the form that the reinforcing fiber (A) is impregnated with a mixture containing the resin particle (B) and the matrix resin (C) (or the matrix resin (C) containing the resin particle (B)) [or in the form that the mixture is attached to the reinforcing fiber (A)]. Such a form can also be expressed as the form that the reinforcing fiber (A) and the resin particle (B) are dispersed in the matrix resin (C).

Such a composition may be a pre-preg (an intermediate material for molding). For example, in a case where the matrix resin (C) is a thermosetting resin component [for example, an epoxy resin component (e.g., a composition containing an epoxy resin and a curing agent)], the composition may be in a semi-cured (or tack free) state.

The form of the composition can be selected according to the shape of the reinforcing fiber (A), or others. Concrete forms may include, for example, (i) a form in which a plurality of the reinforcing fibers (A) arranged in the same direction (or one direction) is impregnated with the mixture and (ii) a form in which a cloth formed with the reinforcing fiber (A) is impregnated with the mixture. A pre-preg composition having the form (i) is known as UD pre-preg or others. A pre-preg composition having the form (ii) is known as cloth pre-preg or others.

(Process for Producing Composition)

Such a composition is obtainable through a resin particle production step and an impregnation step. In the resin particle production step, the semicrystalline thermoplastic resin and an aqueous medium incompatible with the resin are melt-kneaded to prepare a melt-kneaded product, and the aqueous medium is removed from the melt-kneaded product with a hydrophilic solvent to give the resin particle (B). In the impregnation step, the reinforcing fiber (A) is impregnated with the resulting resin particle (B) and the matrix resin (C).

In the resin particle production step, the resin particle (B) is obtainable by a commonly-used forced emulsification in which the resin is melt-kneaded with the aqueous medium. According to the present invention, the resin is shaped into a particulate form by the forced emulsification and then the shaped resin is prepared under a condition different from the conventional method (particularly, under a drying treatment at a low temperature) to give a semicrystalline resin particle having a specific degree of crystallinity. As the forced emulsification, there may be utilized a commonly-used method, for example, a method described in Japanese Patent Application Laid-Open Publication No. 2010-132811.

The aqueous medium can be selected according to the species of the semicrystalline thermoplastic resin and may include, for example, a heat-melting saccharide (e.g., an oligosaccharide such as sucrose or maltotriose; and a sugar alcohol such as xylitol, erythritol, sorbitol, or mannitol) and a water-soluble polymer (e.g., a water-soluble synthetic polymer such as a poly(ethylene glycol), a poly(vinyl alcohol), a poly(sodium acrylate), or a polyacrylamide; and a polysaccharide such as a starch or a methyl cellulose). These aqueous media may be used alone or in combination.

In a case where the semicrystalline thermoplastic resin is a polyamide resin (in particular, an alicyclic polyamide resin), the aqueous medium may be a water-soluble polymer (for example, a water-soluble synthetic polymer such as a poly(ethylene glycol) or a poly(vinyl alcohol)). For example, as the poly(ethylene glycol), "PEG-20000", "PEG-11000", "PEG-1000", and "PEG-200", each manufactured by NOF CORPORATION, may be used alone or in combination. The viscosity of the aqueous medium is one factor for controlling a particle size of a resin particle which is obtained by the forced emulsification. The selection of the viscosity varies according to a desired particle size, a species or molecular weight of the semicrystalline thermoplastic resin, a volume ratio of the semicrystalline thermoplastic resin and the aqueous medium, a shear rate in compounding, or other conditions. The viscosity may be regulated by combination of these conditions. From the viewpoint of easy regulation to an appropriate particle size, the aqueous medium may particularly be the poly(ethylene glycol) (s).

The weight ratio of the aqueous medium relative to 100 parts by weight of the semicrystalline thermoplastic resin may be, for example, about 10 to 100 parts by weight, preferably about 20 to 100 parts by weight, and more preferably about 30 to 100 parts by weight. The volume ratio of the aqueous medium relative to the total volume of the aqueous medium and the semicrystalline thermoplastic resin may be not less than 50% by volume (for example, about 50 to 90% by volume). An excessively high ratio of the aqueous medium may reduce productivity. In contrast, an excessively low ratio of the aqueous medium may make production of a resin particle having a small particle size difficult.

The melt-kneading temperature is a temperature not lower than the melting point or softening point of the semicrystalline thermoplastic resin and can be selected according to the species of the semicrystalline thermoplastic resin. For example, for an alicyclic polyamide resin, the melt-kneading temperature is, e.g., not lower than 250° C. (e.g., about 250 to 350° C.), preferably about 260 to 320° C., and more preferably about 270 to 300° C.

The cooling method after melt-kneading is not particularly limited to a specific one. From the viewpoint of productivity, in a case where the semicrystalline thermoplastic resin is a polyamide resin (in particular, an alicyclic polyamide resin), forcible cooling (rapid cooling) is preferred. For example, the cooling rate may be not less than 1° C./min. (e.g., about 1 to 10° C./min.). The cooling method exerts less influence on the crystallinity of the resin particle compared with the drying condition (heating) after solidification. For a polyamide resin having a low crystallization rate (for example, an alicyclic polyamide resin), the resin may be forcibly cooled.

For the method of removing the aqueous medium from the kneaded product after cooling, a hydrophilic solvent is used. Practically, the aqueous medium is removed by washing the kneaded product with a hydrophilic solvent. As the hydrophilic solvent, for example, there may preferably be used water, an alcohol (e.g., a lower alcohol such as ethanol), a water-soluble ketone (e.g., acetone), or other solvents.

In the method of drying the resin particle obtained by removing the aqueous medium, the resin particle is preferably dried at a low temperature from the viewpoint of prevention of excessive crystallization. The degree of crystallinity of the resin particle varies according to the species of the resin and the aqueous medium, the process temperature, the cooling method, the drying method after removal of the aqueous medium, or other factors. The combination of these factors is diversified. Although it is difficult to simply define the condition for obtaining a semicrystalline resin having a low degree of crystallinity, the drying method among these factors particularly exerts great influence on the crystallinity of the resin.

The drying temperature can be selected according to the species of the semicrystalline thermoplastic resin. The drying temperature may be not higher than (Tg+40)° C., for example, not higher than (Tg+30)° C., preferably not higher than (Tg+20)° C., and more preferably not higher than (Tg+10)° C., or may particularly be a temperature not higher than the glass transition temperature under a reduced pressure, where Tg represents the glass transition temperature of the semicrystalline thermoplastic resin. Specifically, for example, in a case where the semicrystalline thermoplastic resin is an alicyclic polyamide resin, the drying temperature may be not higher than the glass transition temperature, for example, may be about (Tg−50)° C. to Tg° C. and preferably about (Tg−30)° C. to (Tg−10)° C. Moreover, in a case where the semicrystalline thermoplastic resin is an aliphatic polyamide resin, the drying temperature may be not lower than the glass transition temperature, for example, may be about Tg° C. to (Tg+40)° C. and preferably about (Tg+10)° C. to (Tg+35)° C.

In the impregnation step, the reinforcing fiber (A), the resin particle (B), and the matrix resin (C) are mixed to give an impregnation composition. Practically, the reinforcing fiber (A) is impregnated with (or attached to) a mixture containing the resin particle (B) and the matrix resin (C) to give an impregnation composition.

Concrete impregnation methods may include (a) a method of impregnating the reinforcing fiber (A) with the mixture that is liquid, (b) a method of contacting a sheet formed of the mixture with the reinforcing fiber (A) under an applied pressure, and other methods.

In the method (a), the liquid mixture to be used may be the matrix resin (C) that is liquid (liquid at the ordinary temperature) or may be prepared by a proper solvent (a poor solvent to the resin particle (B)). Moreover, the liquid mixture can also be obtained by melting the matrix resin (C).

[Molded Article]

The present invention also includes a molded article of the composition (a molded article comprising the composition). The molded article, which contains the reinforcing fiber (A) and the matrix resin (C) in which the reinforcing fiber (A) is dispersed, can be referred to as a composite [a fiber-reinforced composite (in particular, a carbon fiber composite)].

The process for producing (molding) the molded article can be selected according to the form of the composition or the species of the component of the composition, or others. For example, in a case where the matrix resin (C) is a thermosetting resin component, the molded article can be produced by curing the composition (specifically, the composition having a desired shape). That is, the molded article, in which the matrix resin (C) is a thermosetting resin component, can be referred to as a cured product of the composition. The molding process can also be selected according to the degree of curing of the thermosetting resin component (e.g., non-curing or semi-curing), or others. The molded article may have a one-dimensional form (such as a rod form), a two-dimensional form (such as a sheet form), or a three-dimensional form.

Concrete molding processes may include a hand lay up molding, a SMC (sheet molding compound) press molding, a RIMP (resin infusion molding process), a pre-preg press molding, a pre-preg autoclave, a winding (such as a filament winding or a pin winding), a pultrusion molding, a BMC (bulk molding compound) molding, or other processes.

As described above, the molded article is obtainable. According to the molded article (or composition) of the present invention, the resin particle (B) can increase the reinforcing function of the reinforcing fiber (A) (for example, interlaminar toughness). In particular, according to the present invention, the resin particle (B) having a specific form and a specific particle size efficiently improves the reinforcing effect by the reinforcing fiber (A), and a sufficient reinforcing function is achievable at a relatively low proportion of the resin particle (B).

EXAMPLES

The following examples are intended to describe this invention in further detail and should by no means be interpreted as defining the scope of the invention. Abbreviations of materials used in Examples and Comparative Examples are shown below. Resin particles and test pieces obtained in Examples and Comparative Examples were evaluated for the following items.

[Materials]

Alicyclic PA: alicyclic polyamide, "TROGAMID CX7323" manufactured by Daicel-Evonik Ltd., melting point: 247° C.

Alicyclic PA particle: polyamide 12 particle obtained by chemical pulverization shown below (dissolution in a solvent and then re-precipitation for powdering)

In a 1000-mL pressure glass autoclave, 18 g of an alicyclic polyamide ("TROGAMID CX7323" manufactured by Daicel-Evonik Ltd.), 32 g of a poly(vinyl alcohol) ("GOHSENOL GM-14" manufactured by The Nippon Synthetic Chemical Industry Co., Ltd.), 300 g of N-methyl-2-pyrrolidone as an organic solvent were put, and 99% by volume or more of an atmospheric gas in the autoclave was replaced with nitrogen gas. Then, the contents of the autoclave were heated to 180° C. and were stirred for 4 hours until the polymer was dissolved. Thereafter, 350 g of ion-exchange water as a poor solvent was added dropwise to the autoclave at a speed of 3 g/min. through a liquid transfer pump. At the time when about 200 g of ion-exchange water was added, the liquid system in the autoclave turned white. After the addition of the whole amount of ion-exchange water was completed, the temperature was lowered while stirring. The resulting suspension was filtered to give a precipitate which was then subjected to slurry washing by adding 700 g of ion-exchange water. The washed product was filtered to give a precipitate which was then vacuum-dried at 80° C. for 10 hours to give about 17 g of a white solid.

PA12: polyamide 12, "VESTAMID L1600" manufactured by Daicel-Evonik Ltd.

PA12 particle: polyamide 12 particle obtained by chemical pulverization, "VESTOSINT 2158" manufactured by Daicel-Evonik Ltd.

PA1010: polyamide 1010, "VESTAMID Terra BS1393" manufactured by Daicel-Evonik Ltd.

Amorphous PA: aromatic polyamide, "TROGAMID T5000" manufactured by Daicel-Evonik Ltd.

Matrix resin: mixture of epoxy resin ("jER828" manufactured by Mitsubishi Chemical Corporation) and amine-based curing agent ("jERCURE W" manufactured by Mitsubishi Chemical Corporation)

Carbon fiber: "TC-33" manufactured by HONLU TECHNOLOGY CO., LTD., average fiber diameter: about 7 μm

[Average Particle Size]

A resulting resin particle was dispersed in water, and the average particle size thereof was measured by a laser diffraction/scattering particle diameter distribution measuring apparatus ("LA920" manufactured by Horiba, Ltd.).

[Crystallization Peak (DSC)]

A resulting resin particle was heated from a room temperature to 300° C. at 10° C./min. by using a differential scanning calorimeter ("X-DSC7000" manufactured by Seiko Instruments Inc.), and the presence or absence of a crystallization peak between these temperatures (between the glass transition temperature and the melting point) was observed.

[Wide-Angle X-Ray Diffraction (WAXD)]

The following measurement was performed using an intelligent X-ray diffraction system ("SmartLab" manufactured by Rigaku Corporation). A resulting resin particle was placed on a center of a horizontal round-table sample stage, and a package measurement program "General purpose (focusing method)" was executed to give an X-ray diffraction pattern under the following measurement conditions by focusing method.

(Measurement Conditions)

Primary X-ray source: rotating anticathode X-ray generator having Cu as an anticathode (acceleration voltage-electric current: 45 kV-200 mA)

Scanning step: 0.02°

Scanning rate: 4°/min. (2θ)

[Degree of Crystallinity]

An X-ray powder diffraction software ("PDXL Ver2.3.1.0" manufactured by Rigaku Corporation) was used for fitting (method: FP method, peak shape: logarithmic normal distribution, background precision: none) to a diffraction curve obtained by the wide-angle X-ray diffraction, thereby separating a crystal diffraction peak and an amorphous halo. The degree of crystallinity (%) was determined from the following equation.

Degree of crystallinity=[Sum of integrated intensity of crystal diffraction peak (cps·deg)]/[Sum of integrated intensity of crystal diffraction peak and amorphous halo (cps·deg)]×100%

[Interlaminar Fracture Toughness Test]

For a test piece A obtained, a mode I interlaminar fracture toughness value ($G_{IC}$) at initial crack growth was measured in accordance with Japanese Industrial Standards (JIS) K7086-1993.

[Notched Charpy Impact Strength]

For a test piece B obtained, a Charpy impact strength was measured at a test temperature of 23° C. in accordance with ISO179/1eA.

Example 1

(Production of Resin Particle)

The alicyclic PA was shaped into a fine particulate form by forced emulsification using a poly(ethylene glycol) in accordance with Examples of Japanese Patent Application Laid-Open Publication No. 2010-132811. A melt-kneaded product containing an alicyclic PS and a poly(ethylene glycol) extruded from a die of an extruder was forcibly cooled by a spot cooler and then washed with water for removal of only the poly(ethylene glycol). The washed product was dried at a temperature of 120° C. for 24 hours under a reduced pressure to give a resin particle (powder). The resin particle had an average particle size of 21 μm and had a crystallization peak observed under a heating condition of 10° C./min. by DSC. The DSC chart (heat absorption curve) is shown in FIG. 1. As apparent from FIG. 1, a high peak by crystallization is observed around 170° C., and the degree of crystallinity is also low. The results show that the obtained particle has a low crystallinity.

(Production of Test Piece A)

The resin particle was added in a ratio of 5% by weight to the matrix resin, and the resulting mixture was stirred using a hot stirrer for 24 hours under conditions of 100° C. and 600 rpm. Then, the mixture was allowed to stand in a vacuum vessel for one hour for defoaming to give a matrix resin containing the resin particle.

By hand lay up method, a woven fabric (plain weave) of the carbon fiber was impregnated with the resulting matrix resin containing the resin particle, and then another woven fabric of the carbon fiber was laminated on the woven fabric, and the laminate was impregnated with the matrix resin. This procedure was repeated, and a 12-layer laminate was obtained.

Two types of laminates were produced. Specifically, one type was a 12-layer laminate having 12 woven fabrics, and the other was a 13-layer laminate having 12 woven fabrics and one polyimide film ("KAPTON" manufactured by DU PONT-TORAY CO., LTD.) [the 13-layer laminate in which the polyimide film having a thickness of 25 μm was laminated for precrack formation after lamination of the 6th woven fabric].

Each laminate was put in a thermostatic bath in a state that a pressure of about 8 MPa was loaded, and was allowed to stand at 100° C. for 2 hours and then at 175° C. for 4 hours for curing treatment. The resulting cured product had a thickness of about 2.8 mm. For the laminate containing the polyimide film, the polyimide film was pulled out from the laminate after curing treatment. Thereafter, each laminate was cut into 140 mm long, 25 mm wide, and 2.8 mm thick.

(Production of Test Piece B)

The resin particle was added in a ratio of 20% by weight to the matrix resin, and the mixture was formed into a shape in accordance with ISO179/1eA to give a test piece B.

Comparative Example 1

A test piece was produced in the same manner as Example 1 except that the alicyclic PA particle obtained by chemical pulverization was used as the resin particle. The resin particle had an average particle size of 23 μm and had no crystallization peak observed under a heating condition of 10° C./min. by DSC. The DSC chart (heat absorption curve) is shown in FIG. 2. As apparent from FIG. 2, no peak by crystallization is observed around 170° C., and this shows that the obtained particle has a high crystallinity.

FIG. 3 is a wide-angle X-ray diffraction chart of alicyclic polyamide particles obtained in Example 1 and Comparative Example 1. As apparent from FIG. 3, the X-ray spectrum of the alicyclic polyamide particle obtained in Example 1 has a gentle mountain shape, which shows that the alicyclic polyamide particle has a low crystallinity and unidentifiable crystal form; in contrast, the X-ray spectrum of the alicyclic polyamide particle obtained in Comparative Example 1 has two sharp peaks at 2θ of 17.3° and 2θ of 19.7°, which shows that the alicyclic polyamide particle has an α-type crystal structure and a high degree of crystallinity, and thus the alicyclic polyamide particle has a high crystallinity.

Comparative Example 2

A test piece was produced in the same manner as Example 1 except for the following: in the production of the resin particle, the melt-kneaded product was allowed to cool without using the spot cooler, and after removal of the poly(ethylene glycol) the resulting product was dried by heating at 180° C. for 3 hours without drying under a reduced pressure. The resin particle had an average particle size of 23 μm and had no crystallization peak observed under a heating condition of 10° C./min. by DSC, and thus the resin particle had a high degree of crystallinity.

Example 2

A test piece was produced in the same manner as Example 1 except for the following: in the production of the resin particle, the PA12 and a saccharide were used instead of the alicyclic PA and the poly(ethylene glycol), the melt-kneaded product was allowed to cool without using the spot cooler, and after removal of the saccharide the resulting product was dried by heating at 80° C. for 3 hours without drying under a reduced pressure. The resin particle had an average particle size of 20 μm and had a crystallization peak observed under a heating condition of 10° C./min. by DSC. The DSC chart (heat absorption curve) is shown in FIG. 4. As apparent from FIG. 4, a peak by crystallization is observed around 170° C. FIG. 5 is a wide-angle X-ray diffraction chart. As apparent from FIG. 5, the X-ray spectrum of the obtained PA12 particle has one peak at 2θ of 21.5°, which shows that the PA12 particle has a γ-type crystal structure.

Comparative Example 3

A test piece was produced in the same manner as Example 1 except that the PA12 particle obtained by chemical pulverization was used as the resin particle. The resin particle had an average particle size of 24 μm and had no crystallization peak observed under a heating condition of 10° C./min. by DSC. The DSC chart (heat absorption curve) is shown in FIG. 6. As apparent from FIG. 6, no peak by crystallization is observed around 170° C. FIG. 7 is a wide-angle X-ray diffraction chart. As apparent from FIG. 7, the X-ray spectrum of the PA12 particle obtained in Comparative Example 3 has two peaks at 2θ of 20.6° and 2θ of 22.3°, which shows that the PA12 particle has an α-type crystal structure.

Example 3

A test piece was produced in the same manner as Example 1 except for the following: in the production of the resin particle, the PA1010 and a saccharide were used instead of the alicyclic PA and the poly(ethylene glycol), the melt-kneaded product was allowed to cool without using the spot cooler, and after removal of the saccharide the resulting product was dried by heating at 80° C. for 3 hours without drying under a reduced pressure. The resin particle had an average particle size of 22 μm and had a crystallization peak observed under a heating condition of 10° C./min. by DSC. FIG. 8 is a wide-angle X-ray diffraction chart. As apparent from FIG. 8, the X-ray spectrum of the PA1010 particle obtained in Example 3 has two peaks at 2θ of 20.4° and 2θ of 23.6°, which shows that the PA1010 particle has an α-type crystal structure.

Comparative Example 4

The PA1010 was shaped into a fine particulate form by chemical pulverization. The resulting fine particle was used to prepare a test piece in the same manner as Example 1. The resin particle had an average particle size of 18 μm and had no crystallization peak observed under a heating condition of 10° C./min. by DSC. FIG. 9 is a wide-angle X-ray diffraction chart. As apparent from FIG. 9, the X-ray spectrum of the PA1010 particle obtained in Comparative Example 4 has two peaks at 2θ of 20.0° and 2θ of 24.1°, which shows that the PA1010 particle has an α-type crystal structure. The PA1010 particle had a degree of crystallinity higher than that of the PA1010 particle obtained in Example 3.

Example 4

A test piece was produced in the same manner as Example 1 except that, in the production of the resin particle, a poly(vinyl alcohol) was used instead of the poly(ethylene glycol). The resin particle had an average particle size of 11 μm and had a crystallization peak observed under a heating condition of 10° C./min. by DSC.

Example 5

A test piece was produced in the same manner as Example 1 except for the following: in the production of the resin particle, the PA12 and a saccharide were used instead of the alicyclic PA and the poly(ethylene glycol), the melt-kneaded product was allowed to cool without using the spot cooler, and after removal of the saccharide the resulting product was dried by heating at 80° C. for 3 hours without drying under a reduced pressure. The resin particle had an average particle size of 5 μm and had a crystallization peak observed under a heating condition of 10° C./min. by DSC.

Comparative Example 5

A test piece was produced in the same manner as Example 1 except for the following: in the production of the resin particle, the amorphous PA was used instead of the alicyclic PA, and after removal of the poly(ethylene glycol) the resulting product was dried at 140° C. for 24 hours under a reduced pressure. The resin particle had an average particle size of 19 μm and had no crystallization peak observed under a heating condition of 10° C./min. by DSC.

Comparative Example 6

A test piece was produced with no resin particle.
Table 1 shows evaluation results of the resin particles and test pieces obtained in Examples and Comparative Examples.

TABLE 1

| | Example 1 | Comparative Example 1 | Comparative Example 2 | Example 2 | Comparative Example 3 | Example 3 | Comparative Example 4 | Example 4 | Example 5 | Comparative Example 5 | Comparative Example 6 |
|---|---|---|---|---|---|---|---|---|---|---|---|
| Material | Alicyclic PA | | | PA12 | | PA1010 | | Alicyclic PA | PA12 | Amorphous PA | — |
| Tg | about 135° C. | | | about 50° C. | | about 50° C. | | about 135° C. | about 50° C. | about 150° C. | — |
| Drying temperature | 120° C. | 80° C. | 180° C. | 80° C. | — | 80° C. | — | 120° C. | 80° C. | 140° C. | — |

TABLE 1-continued

| | Example 1 | Comparative Example 1 | Comparative Example 2 | Example 2 | Comparative Example 3 | Example 3 | Comparative Example 4 | Example 4 | Example 5 | Comparative Example 5 | Comparative Example 6 |
|---|---|---|---|---|---|---|---|---|---|---|---|
| Crystal form | — | α-type | α-type | γ-type | α-type | α-type | α-type | α-type | γ-type | — | — |
| Degree of crystallinity | 11% | 71% | 64% | 70% | 55% | 41% | 86% | 14% | 73% | — | — |
| Average particle size | 21 μm | 23 μm | 23 μm | 20 μm | 24 μm | 22 μm | 18 μm | 11 μm | 5 μm | 19 μm | — |
| Presence or absence of peak by DSC | Presence | Absence | Absence | Presence | Absence | Presence | Absence | Presence | Presence | — (Amorphous) | — |
| $G_{IC}$ [kJ/m$^2$] | 0.55 | 0.44 | 0.49 | 0.51 | 0.47 | 0.53 | 0.48 | 0.53 | 0.50 | 0.48 | 0.42 |
| Impact strength [kJ/m$^2$] | 43 | 20 | 23 | 39 | 19 | 41 | 22 | 33 | 31 | 22 | 21 |

As apparent from the results shown in Table 1, in Examples the resin particles have a crystallization peak and the test pieces have a high interlaminar toughness and a high impact strength; in contrast, in Comparative Examples the resin particles have no crystallization peak and the test pieces have a low interlaminar toughness.

INDUSTRIAL APPLICABILITY

The resin composition of the present invention is usable as a composition for a fiber-reinforced composite. Such a composite is applicable for structural members (structural materials) in various fields, for example, vehicles (for example, aircraft, helicopters, rockets, automobiles, motorcycles, bicycles, trains, ships, and wheelchairs), artificial satellites, windmills, sports products (shafts of golf clubs, tennis rackets), chassis (such as chassis of laptops), molded articles in medical fields (such as artificial bones), IC trays, fishing rods, and bridge piers.

The invention claimed is:

1. A resin composition comprising (A) a reinforcing fiber, (B) a resin particle, and (C) a matrix resin, wherein
   the reinforcing fiber (A) contains a carbon fiber, and
   the resin particle (B) contains a semicrystalline thermoplastic resin, and the semicrystalline thermoplastic resin is a polyamide resin having an alicyclic structure and a glass transition temperature of not lower than 100° C. and/or an aliphatic polyamide resin,
   the semicrystalline thermoplastic resin in the resin particle (B) has an exothermic peak in a temperature range between a glass transition temperature of the semicrystalline thermoplastic resin and a melting point of the semicrystalline thermoplastic resin, the exothermic peak being determined by heating the resin particle (B) at a rate of 10° C./min. by differential scanning calorimetry (DSC), and
   the resin particle (B) has a spherical shape and an average particle size of 15 to 25 μm.

2. The resin composition according to claim 1, wherein the semicrystalline thermoplastic resin is a polyamide resin having a melting point of not lower than 150° C.

3. The resin composition according to claim 1, wherein the semicrystalline thermoplastic resin is a polyamide resin having a γ-type crystal structure or a degree of crystallinity of not more than 50%.

4. The resin composition according to claim 1, wherein the resin particle (B) further comprises an impact modifier.

5. The resin composition according to claim 1, wherein the matrix resin (C) is a thermosetting resin.

6. A molded article comprising a resin composition recited in claim 1.

7. An additive for a composition comprising (A) a reinforcing fiber containing a carbon fiber and (C) a matrix resin to increase or improve a reinforcing effect of the reinforcing fiber (A),
   wherein the additive comprises (B) a resin particle,
   the resin particle (B) contains a semicrystalline thermoplastic resin, and the semicrystalline thermoplastic resin is a polyamide resin having an alicyclic structure and a glass transition temperature of not lower than 100° C. and/or an aliphatic polyamide resin,
   the semicrystalline thermoplastic resin in the resin particle (B) has an exothermic peak in a temperature range between a glass transition temperature of the semicrystalline thermoplastic resin and a melting point of the semicrystalline thermoplastic resin, the exothermic peak being determined by heating the resin particle (B) at a rate of 10° C./min. by differential scanning calorimetry (DSC), and
   the resin particle (B) has a spherical shape and an average particle size of 15 to 25 μm.

* * * * *